United States Patent
Zhou et al.

(10) Patent No.: US 11,071,165 B2
(45) Date of Patent: Jul. 20, 2021

(54) COMMUNICATION METHOD, EQUIPMENT, SYSTEM, AND COMPUTER STORAGE MEDIUM

(71) Applicant: ZTE CORPORATION, Guangdong (CN)

(72) Inventors: Chenyun Zhou, Shenzhen (CN); Yin Gao, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 5 days.

(21) Appl. No.: 16/669,299

(22) Filed: Oct. 30, 2019

(65) Prior Publication Data

US 2020/0100323 A1 Mar. 26, 2020

Related U.S. Application Data

(63) Continuation of application No. PCT/CN2018/073097, filed on Jan. 17, 2018.

(30) Foreign Application Priority Data

May 5, 2017 (CN) .......................... 201710313516.5

(51) Int. Cl.
*H04W 80/06* (2009.01)
*H04W 24/04* (2009.01)

(52) U.S. Cl.
CPC .......... *H04W 80/06* (2013.01); *H04W 24/04* (2013.01)

(58) Field of Classification Search
None
See application file for complete search history.

(56) References Cited

U.S. PATENT DOCUMENTS

| 7,680,051 | B2 * | 3/2010 | Kumar | H04L 69/163 370/236 |
| 2002/0075900 | A1 | 6/2002 | Turina et al. | |
| 2009/0052466 | A1 * | 2/2009 | Khalid | H04L 45/122 370/467 |
| 2010/0150161 | A1 * | 6/2010 | Saksena | H04L 45/124 370/400 |

(Continued)

FOREIGN PATENT DOCUMENTS

| CN | 1400777 A | 3/2003 |
| CN | 101060469 A | 10/2007 |
| CN | 101489247 A | 7/2009 |
| CN | 101541093 A | 9/2009 |
| CN | 101729324 A | 6/2010 |
| CN | 101998519 A | 3/2011 |

(Continued)

OTHER PUBLICATIONS

International Search Report and Written Opinion for International Appl. No. PCT/CN2018/073097, dated Apr. 9, 2018.

(Continued)

*Primary Examiner* — Otis L Thompson, Jr.
(74) *Attorney, Agent, or Firm* — Foley & Lardner LLP

(57) ABSTRACT

Disclosed are a communication method, equipment, system, and computer storage medium. The method includes: establishing, by a first network node, a stream control transmission protocol (SCTP) association pool with a second network node, where the SCTP association pool includes at least one SCTP associations; selecting, by the first network node, from the SCTP association pool, an SCTP association for signaling transmission; and performing, by the first network node, via the SCTP association, the signaling transmission with the second network node.

14 Claims, 22 Drawing Sheets

(56) References Cited

U.S. PATENT DOCUMENTS

| | | | | |
|---|---|---|---|---|
| 2011/0153844 A1* | 6/2011 | Bovo | ................... | H04W 24/02 |
| | | | | 709/228 |
| 2013/0064100 A1* | 3/2013 | Bovo | ...................... | H04L 41/12 |
| | | | | 370/241 |
| 2016/0242084 A1* | 8/2016 | Campbell | ........... | H04L 65/1083 |
| 2019/0075023 A1* | 3/2019 | Sirotkin | ................ | H04W 88/08 |

FOREIGN PATENT DOCUMENTS

| | | | | |
|---|---|---|---|---|
| EP | 2 093 975 A1 | 8/2009 | | |
| JP | 4998316 B2 | 8/2012 | | |
| KR | 20030089992 A | 11/2003 | | |
| KR | 20150003273 A | 1/2015 | | |
| WO | WO-2016/099357 A1 | 6/2016 | | |
| WO | WO-2017178929 A1 * | 10/2017 | .............. | H04W 8/08 |
| WO | WO-2018201757 A1 * | 11/2018 | .............. | H04L 12/28 |

OTHER PUBLICATIONS

3GPP, "LTE; Evolved Universal Terrestrial Radio Access Network (E-UTRAN); S1 signalling transport", ETSI TS 136 412 V14.0.0, Apr. 30, 2017 (10 pages).

Extended European Search Report for EP Appl. No. 18794060.6 dated Dec. 17, 2020 (9 pages).

First Chinese Office Action on CN 201710313516.5 dated Nov. 27, 2020 (11 pages).

First Office Action for KR Appl. No. 10-2019-7035751 dated Dec. 24, 2020 (with English translation, 10 pages).

Nokia, "Text Proposal on SCTP/IP", 3GPP TSG-RAN WG3 Meeting #94, R3-163111, Reno, USA, Nov. 18, 2016 (2 pages).

Nortel: "Text proposal for X2 Multiple SCTP association", 3GPP Draft; R3-080112 CR_Mul tipleSCTPAsso_ 10.2.5 36.422_Revo, 3rd Generation Partnership Project (3GPP), Mobile Competence Centre ; 650, Route Des Lucioles ; F-06921 Sophia-Antipolis Cedex ; France, vol. RAN WG3, No. Sorrento, Italy; Feb. 5, 2008, 5 Feb. 2008, XP050163338 (2 Pages).

Stewart Netflix R et al: "Stream Control Transmission Protocol (SCTP) Network Address Translation Support; draft-ietf-tsvwg-natsupp-10. txt", Stream Control Transmission Protocol (SCTP) Network Address Translation Support; draft-ietf-tsvwg-natsupp-10. txt, Internet Engineering Task Force, IETF; StandardWorkingDraft, Internet Society (ISOC) 4, Rue Des Falaises CH—1205 Geneva, Switzerland, Mar. 13, 2017 (Mar. 13, 2017), pp. 1-44, XP015118745.

T. Dreibholz, "Applicability of Reliable Server Pooling for SCTP-Based Endpoint Mobility", IETF Network Working Group draft-dreibholz-rserpool-applic-mobility-20, Jan. 19, 2017 (8 pages).

* cited by examiner

COMMUNICATION METHOD, EQUIPMENT, SYSTEM, AND COMPUTER STORAGE MEDIUM

CROSS-REFERENCE TO RELATED APPLICATIONS

This application claims the benefit of priority under 35 U.S.C. § 120 as a continuation of PCT Patent Application No. PCT/CN2018/073097, filed on Jan. 17, 2018, which claims priority to Chinese patent application No. 201710313516.5 filed on May 5, 2017, the disclosure of each of which is incorporated herein by reference in its entirety.

TECHNICAL FIELD

The present invention relates to wireless communication technologies and, in particular, to a communication method, equipment, system, and computer storage medium.

BACKGROUND

At present, a stream control transmission protocol (SCTP) is generally adopted between network nodes of a wireless communication system, for example, between evolved Nodes B (eNBs), mobility management entities (MMES) and other base stations and core network devices, to transmit control signaling, so as to ensure reliability of signaling transmission. Above the SCTP, different application layer protocols, such as the S1 application protocol (S1AP) and the X2 application protocol (X2AP), are adopted between different network nodes according to demands of applications. Currently, according to the description in Chapter 7 of the 3rd Generation Partnership Project (3GPP) 36.412, an application protocol layer of a pair of network nodes, such as between an eNodeB and an MME or between two eNodeBs, has only one SCTP association.

However, the current development of the communication technology has brought about following cases: (1) in order to ensure reliability of communication systems, operators perform remote hot backup on network nodes of the core network, thereby improving availability of the network nodes, and hot backup network nodes are independent from each other; (2) in the 5th-Generation mobile communication technology (5G), in order to meet requirements of multiple application scenarios, functions of the network node are sliced, for example, for a same core network, part of functions of the core network is deployed on a base station side in one slice application, and the functions of the core network remain in a current central node deployment mode in another network slice; or for a same base station, the control plane of the base station is deployed close to the core network in one slice, and the control plane remains in an existing deployment mode in another slice; and (3) in order to share load among multiple master control boards in a traditional network. All this leads the network nodes to be deployed in a distributed manner.

Since the current application protocol layer supports only one SCTP association, when three cases of distributed deployment of the network nodes occur, the control signaling needs to be forwarded to the service network node or board on which the SCTP protocol is deployed, which causes a detour of the control signaling and thus increases communication delay.

SUMMARY

Embodiments of the present invention desire to provide a communication method, equipment, system, and computer storage medium, which can reduce communication delay caused by a detour of control signaling.

Technical solutions of the present invention are implemented as follows.

In a first aspect, the embodiments of the present invention provide a communication method.

The method includes following steps.

A first network node establishes an SCTP association pool with a second network node, where the SCTP association pool includes at least one SCTP association.

The first network node selects an SCTP association for signaling transmission from the SCTP association pool.

The first network node performs the signaling transmission with the second network node via the SCTP association.

In a second aspect, the embodiments of the present invention further provide a communication method. The method includes following steps.

A second network node establishes an SCTP association pool with a first network node, where the SCTP association pool includes at least one SCTP association.

The second network node receives signaling transmitted by the first network node via an SCTP association, where the SCTP association is selected by the first network node.

In a third aspect, the embodiments of the present invention further provide a network node equipment. The network node equipment includes a first network interface, a first memory and a first processor.

The first network interface is configured to receive and send data in a process of information transceiving with other external network nodes.

The first memory is configured to store computer programs executable on the first processor.

The first processor is configured to, when executing the computer programs, execute steps of the communication method described in the first aspect of the present invention.

In a fourth aspect, the embodiments of the present invention further provide a network node equipment. The network node equipment includes a second network interface, a second memory and a second processor.

The second network interface is configured to receive and send data in a process of information transceiving with other external network nodes.

The second memory is configured to store computer programs executable on the second processor.

The second processor is configured to, when executing the computer programs, execute steps of the communication method described in the second aspect of the present invention.

In a fifth aspect, the embodiment of the present invention further provide a computer-readable storage medium, which is configured to store computer programs, where the computer programs are configured to, when executed by a processor, implement steps of the communication method described in the first aspect of the present invention.

In a sixth aspect, the embodiments of the present invention further provide a computer-readable storage medium, which is configured to store computer programs, where the computer programs are configured to, when executed by a processor, implement steps of the communication method described in the second aspect of the present invention.

In a seventh aspect, the embodiments of the present invention further provide a communication system supporting multiple SCTP associations. The system includes a first network node and a second network node.

The first network node is configured to establish an SCTP association pool with the second network node, where the SCTP association pool includes at least one SCTP association; select, from the SCTP association pool, an SCTP association for signaling transmission; and perform the signaling transmission with the second network node via the SCTP association.

The second network node is configured to establish an SCTP association pool with the first network node, where the SCTP association pool includes at least one SCTP association; and receive signaling transmitted by the first network node via an SCTP association, where the SCTP association is selected by the first network node.

In the communication method, equipment, system and computer storage medium provided by the embodiments of the present invention, a signaling transmission service is performed through multiple SCTP associations between network nodes, greatly reducing the communication delay caused by the detour of control signaling.

DETAILED DESCRIPTION

Technical solutions in embodiments of the present invention are described clearly and completely in conjunction with the drawings in the embodiments of the present invention.

Embodiment 1

Figure 1:
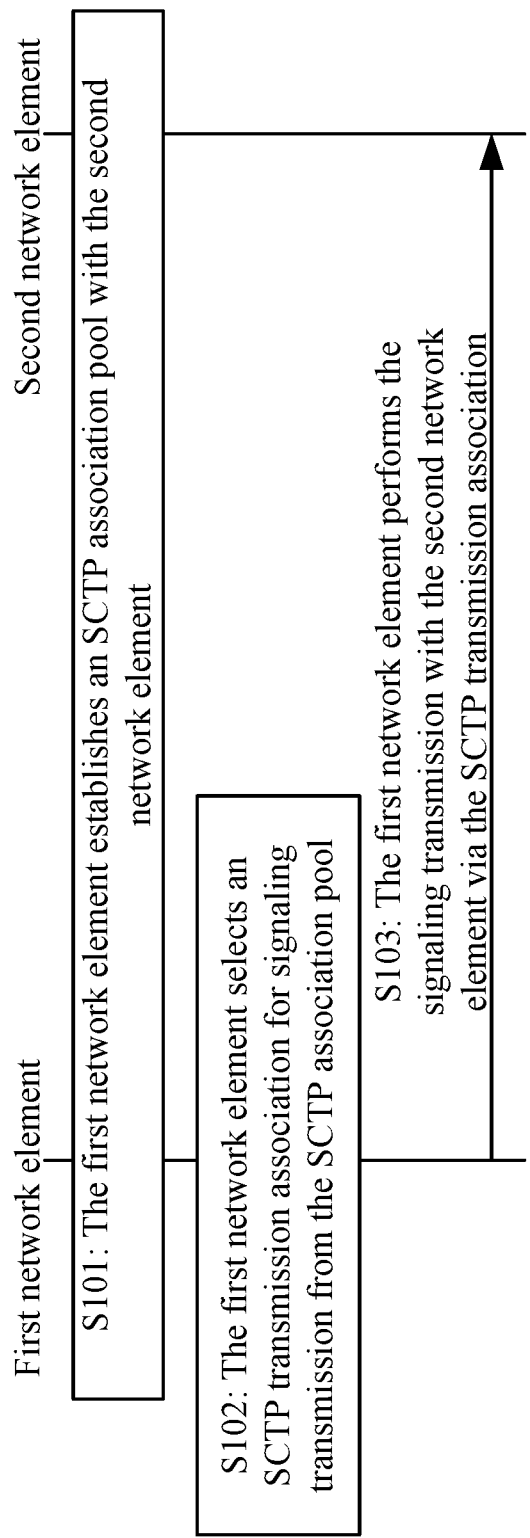
FIG. 1 is a schematic diagram of a process of a communication method supporting multiple SCTP associations according to an embodiment of the present invention.

FIG. 1 shows a communication method supporting multiple SCTP associations provided by an embodiment of the present invention. This method may be applied to a local network node and a peer network node, which are represented as a first network node and a second network node in this embodiment respectively. It can be understood that when the local network node is the first network node, the peer network node is the second network node; similarly, when the local network node is the second network node, the peer network node is the first network node, which is not specifically limited in this embodiment. The method may include steps described below.

In S101, the first network node establishes an SCTP association pool with the second network node.

The SCTP association pool includes one or more SCTP associations that are independent from each other.

In S102, the first network node selects an SCTP association for signaling transmission from the SCTP association pool.

In S103, the first network node performs the signaling transmission with the second network node via the SCTP association.

According to the technical solution shown in FIG. 1, an SCTP association pool including multiple SCTP associations is established between the first network node and the second network node, and a service is provided for the signaling transmission between network nodes via the SCTP association pool. Therefore, the technical solution can not only provide a highly reliable transmission service for the network nodes, but also support seamless migration of hot backup of the network nodes. In addition, a detour of control signaling and a single point of a protocol stack can be avoided when the network nodes are deployed in a geographically distributed manner.

Figure 2:
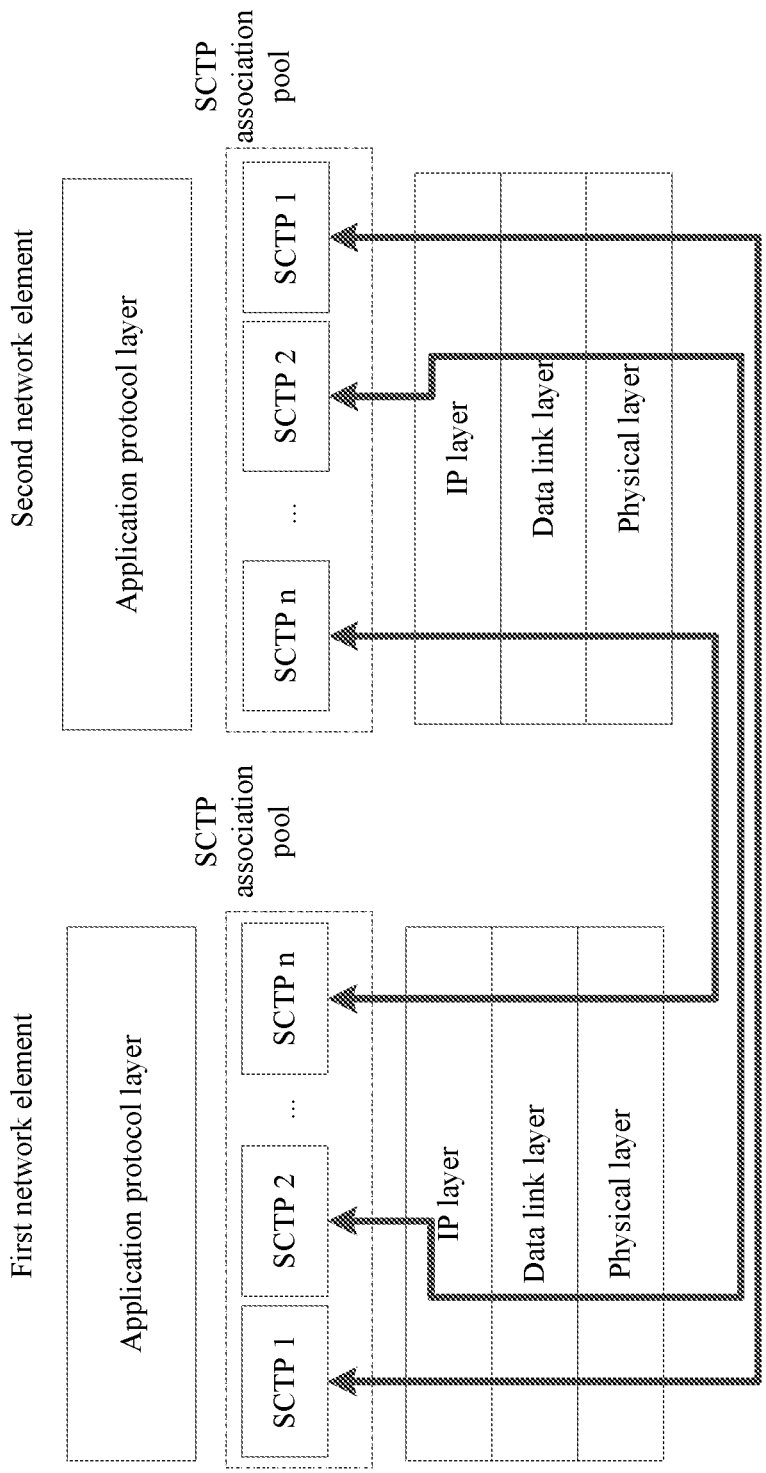
FIG. 2 is a schematic diagram of a network architecture according to an embodiment of the present invention.

FIG. 2 is a schematic diagram of a network architecture according to an embodiment of the present invention. This network architecture includes a first network node and a second network node. It can be seen from FIG. 2 that an association pool containing n SCTP associations exists under application protocol layers and above IP layers of the first network node and the second network node, the SCTP associations in the association pool are independent from each other, and signaling transmission between the first network node and the second network node may be performed via the SCTP associations in the association pool, thereby implementing an effect implemented by the technical solution shown in FIG. 1.

Exemplarily, the step of S101 in FIG. 1 shows a process of establishing an SCTP association pool. In this embodiment, two implementation schemes are provided for this establishment process.

Scheme 1

Figure 3:
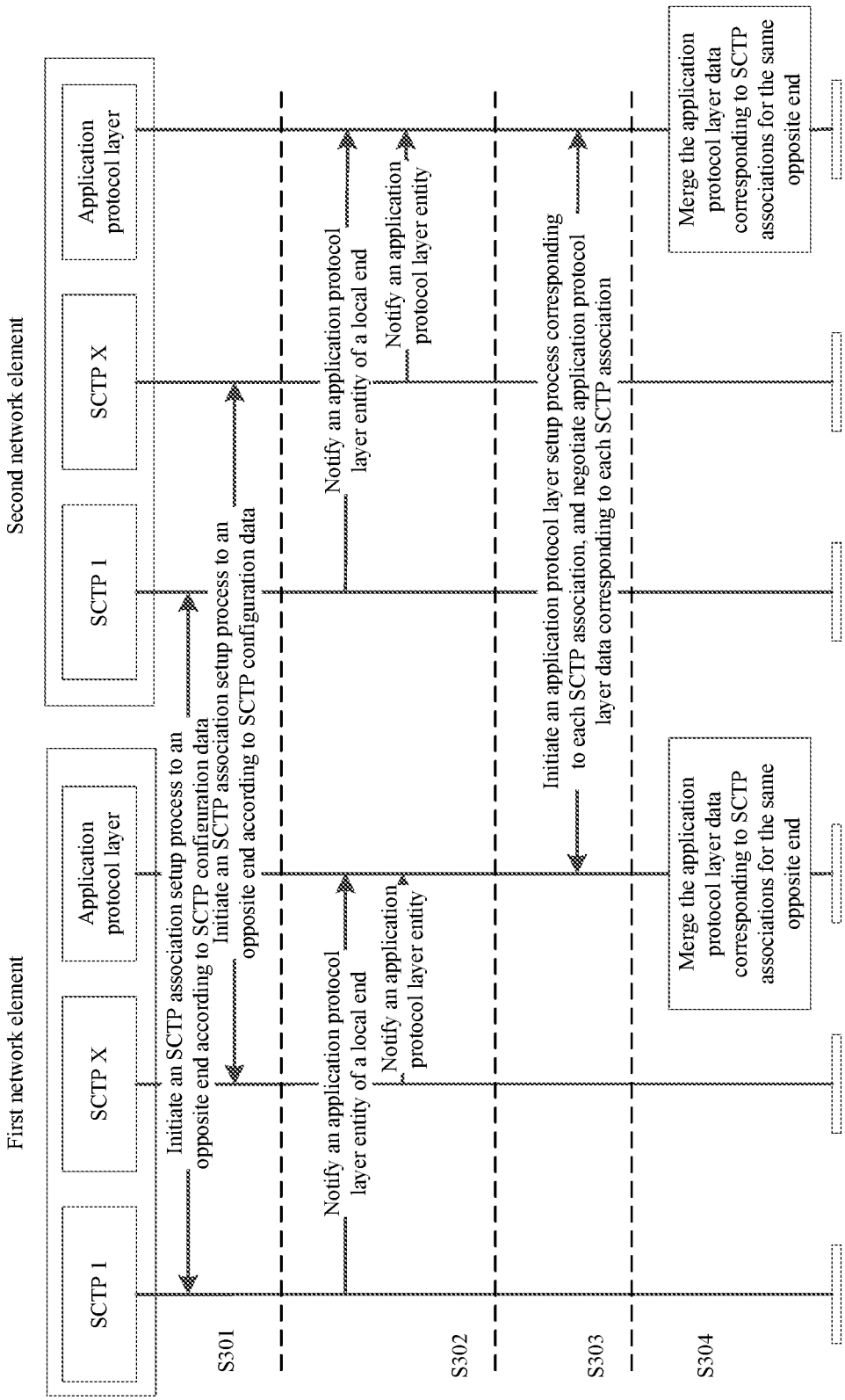
FIG. 3 is a schematic diagram of a process of establishing an association pool according to an embodiment of the present invention.

FIG. 3 shows a process of establishing an association pool according to an embodiment of the present invention. The process may include steps described below.

In S301, one or each of the first network node and the second network (e.g., local end) initiates an SCTP association setup process to an opposite end (e.g., the other one of the first network node and the second network) according to SCTP configuration data, and establishes an SCTP association pool consisting of multiple SCTP associations between a local end and the opposite end.

Specifically, the SCTP configuration data may be configured through operation administration and maintenance (OAM). The SCTP configuration data may include an IP tetrad, a type of the peer network node and an SCTP association identifier. Optionally, the SCTP configuration data may also include slice information. The IP tetrad includes: an IP address and a port number of the local network node, and an IP address and a port number of the peer network node. It can be understood that the SCTP association identifier is used for representing an SCTP association corresponding to the SCTP configuration data.

It can be understood that the association setup process may be started by initiating a request and be implemented through a four-way handshake process. For specific steps of the SCTP association setup process, reference is made to related processes in the current 3GPP protocol, and thus no further details are repeated in this embodiment.

In S302, each SCTP association entity in the SCTP association pool of the first network node and the second network node sends a notification to an application protocol layer entity of the local end.

It can be understood that this notification is used for notifying that the SCTP association is normally established.

In S303, one or each of the first network node and the second network initiates an application protocol layer setup process corresponding to each SCTP association to the opposite end via each SCTP association, and the first network node and the second network negotiate application protocol layer data corresponding to each SCTP association.

In S304, each of the first network node and the second network merges the application protocol layer data corresponding to one or more SCTP associations for a same opposite end, and combine the SCTP associations for the same opposite end into the same activated association pool.

For the technical solution shown in FIG. 3, it is to be noted that for negotiated data for multiple times of the establishment of the application protocol layers performed with respect to multiple associations in the same association pool, different types of data may be merged in an incremental manner, and the same type of data may be subject to latest negotiated data. In the process of establishing multiple application protocol layers, after a certain application protocol layer is established, the network node may start to provide services normally, and the subsequent establishment process of application protocol layers will not affect the established application context, that is, whether to maintain the application context may be explicitly indicated in a message of the subsequent establishment of application protocol layers. Similarly, the above steps S301 to S304 are performed to implement addition of an association into the SCTP association pool. In addition, an initial association pool may have only one SCTP association, and more SCTP associations may be added dynamically according to requirements.

In addition, the application protocol layer maintains following information for each SCTP association: an association state, an association priority, an association slice attribute, and association round-trip time. The association state includes a service state and a service suspension state. The association priority may be set to high or low, and low by default. The association slice attribute is determined by the application protocol layer and is closely associated with the SCTP. When a distributed network node is divided into multiple different slices, in order to distinguish these slices, a slice attribute for delivering transmission signaling may be explicitly required.

For a distributed scenario, it is to be specially noted that the application protocol layer may set the priority of an SCTP association deployed at a closest position to high, thereby avoiding detour transmission of signaling.

Scheme 2

Figure 4:
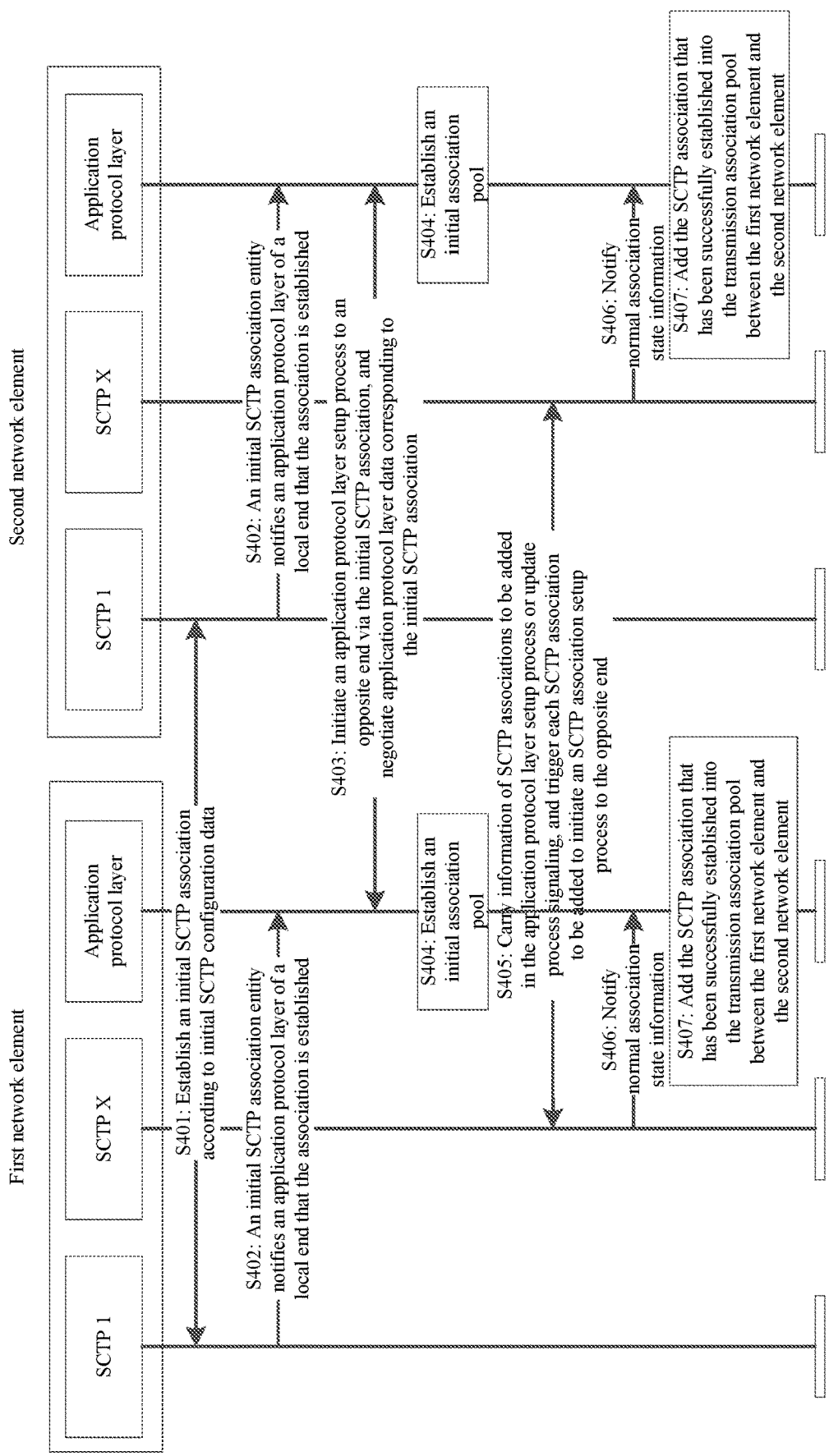
FIG. 4 is a schematic diagram of another process of establishing an association pool according to an embodiment of the present invention.

In addition to the establishment process in the scheme 1, the SCTP association pool may further be established in the following manner: the first network node and the second network node first negotiate initial SCTP association information, and perform application protocol layer interface signaling interaction via the initial SCTP association to add one or more pieces of SCTP association information. As shown in FIG. 4, the process may specifically include steps described below.

In S401, one or each of the first network node and the second network node, according to initial SCTP configuration data, initiates an initial SCTP association setup process, and the first network node and the second network node establish an initial SCTP association.

Specifically, the initial SCTP configuration data may be statically configured through OAM, and may specifically include an IP tetrad, a type of the peer network node and an initial SCTP association identifier, and optionally, may also include slice information.

In S402, a respective initial SCTP association entity of each of the first network node and the second network node notifies an application protocol layer of the local end that the association has been established.

In S403, one or each of the first network node and the second network initiates an application protocol layer setup process to the opposite end via the initial SCTP association, and the first network node and the second network negotiate application protocol layer data corresponding to the initial SCTP association.

In S404, the respective application protocol layer of each of the first network node and the second network node adds the initial SCTP association into a transmission association pool between the local end and the opposite end.

It is to be noted that after the initial SCTP association and the association pool are established, in order to support multiple SCTP associations, one or more pieces of SCTP association information used by the local end for transmission with the opposite end may be carried in signaling established by the application protocol layer, or the one or more pieces of SCTP association information used by the local end for transmission with the opposite end may be carried in an application protocol layer update process. Here, the application protocol layer signaling may include a radio access network (RAN)-to-core network interface setup response message or a core network configuration update message.

In S405, each of the first network node and the second network node carries information of SCTP associations to be added in the application protocol layer setup process or update process signaling, and triggers each SCTP association to be added to initiate an SCTP association setup process to the opposite end. The application protocol layer update process signaling includes a core network configuration update message. The first network node carries a list of information of SCTP associations to be added in the application protocol layer setup process signaling.

In S406, the respective SCTP association entity that has been successfully established in each of the first network node and the second network node notifies the application protocol layer of the local end of normal association state information.

In S407, the respective application protocol layer of each of the first network node and the second network node adds the SCTP association that has been successfully established into the transmission association pool between the first network node and the second network node.

Through the technical solution in FIG. 4, the process of establishing an SCTP association pool is also completed.

Through any one of the above two schemes, an SCTP association pool is established between the first network node and the second network node. Thereafter, when signaling interaction needs to be performed between network nodes, the application protocol layer may select an SCTP association in a suitable state according to actual requirements.

Exemplarily, when the application protocol layer of the first network node or the second network node needs to transmit signaling to the opposite end, a suitable SCTP association needs to be selected from the established SCTP association pool and then be used for transmission of the application protocol layer signaling. Therefore, using the first network node as an example, referring to FIG. 5, the first network node selects an SCTP association for signaling transmission from the SCTP association pool according to a preset selection strategy, which may specifically include steps described below.

In S501, the first network node determines a target network node type and a target network node identifier of signaling to be transmitted according to application layer protocol data, and also needs to determine slices of the signaling to be transmitted, if any.

In S502, according to the target network node type, the target network node identifier and the slices (if any), a candidate SCTP association set for the signaling transmission is selected from the SCTP association pool.

Specifically, the first network node may select a candidate activated association pool and delete SCTP associations in a blocked state from the activated association pool, so as to construct the candidate SCTP association set.

It is to be noted that when the application layer of the first network node has a slice attribute, SCTP associations of undesired slices are deleted from the candidate association set according to the slice attribute.

In S503, SCTP associations with a high priority are selected from the candidate SCTP association set to construct an optimal SCTP association set In S504, when the optimal SCTP association set is not empty, according to a round robin (RR) principle, an SCTP association is selected from the optimal SCTP association set as the SCTP association;

when the optimal SCTP association set is empty, according to a minimal round-trip time (RTT) principle, an SCTP association is selected from the optimal SCTP association set as the SCTP association.

Figure 5:
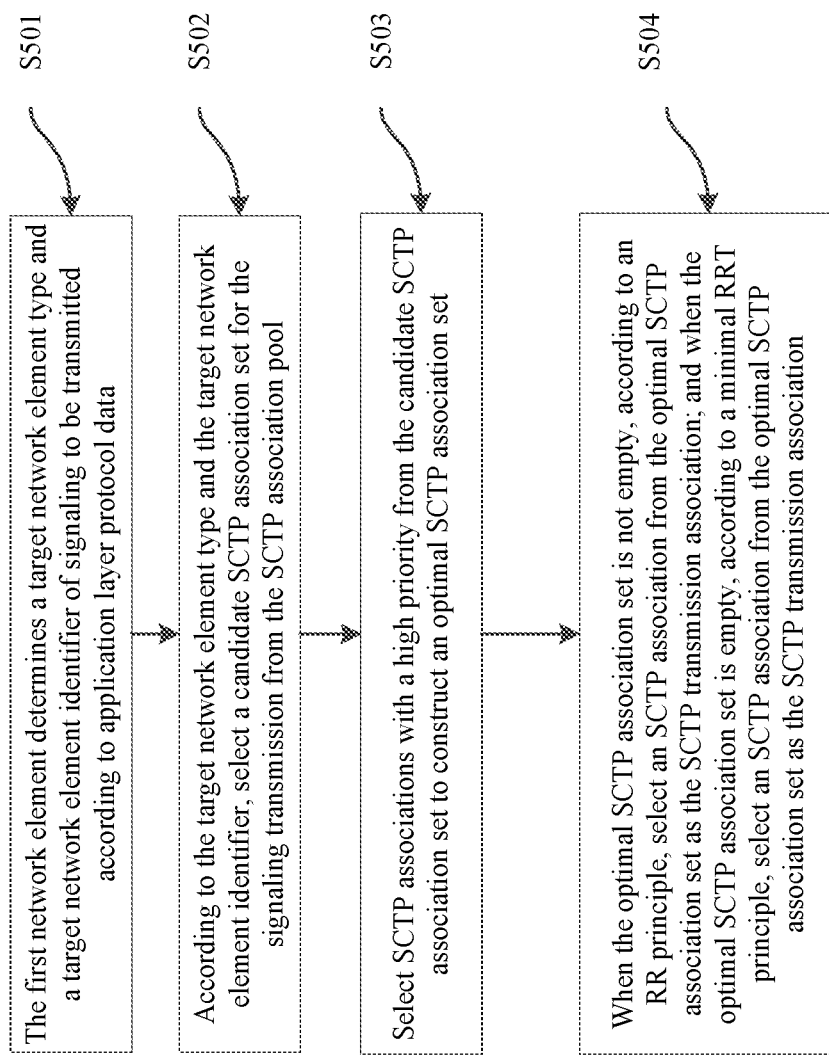
FIG. 5 is a schematic diagram of a process of selecting an SCTP association according to an embodiment of the present invention.

For the technical solution shown in FIG. 5, in the case of distributed network node, it is desired to prevent user-level context of an application or a user from dynamically migrating between network nodes. In order to address this situation, after receiving the transmission signaling via the SCTP association, the application protocol layer needs to save the SCTP association used for the transmission signaling, and subsequent this SCTP association is selected for the signaling of the same application or the same user until this SCTP association is replaced by another SCTP association.

Exemplarily, referring to FIG. 6, when an SCTP association in the SCTP association pool exits the service state, the technical solution shown in FIG. 1 may also include steps described below.

In S601, when the application protocol layer or the user decides to delete an SCTP association from the SCTP association pool through the OAM, the first network node sends an update request message to the second network node. It is to be noted that the update request message instructs to delete one or more SCTP associations.

In S602, the second network node returns an update request response message to the first network node.

Specifically, for SCTP associations in the SCTP association pool established in the scheme 1 shown in FIG. 3, the SCTP association to be deleted may be used for sending the update request message and the update request response message; and for SCTP associations in the SCTP association pool established in the scheme 2 shown in FIG. 4, a list of identifiers of the SCTP association to be deleted may be carried in the update request message and the update request response message. It can be understood that this list may contain identifiers of one or more SCTP associations to be deleted. At this point, the SCTP association for transmitting the update request message and the update request response message may be randomly selected from the SCTP association pool.

In S603, the SCTP association to be deleted in the first network node and the second network node is out of service, and is notified to the application protocol layer.

It is to be noted that in some possible abnormal situations, when an SCTP association in the SCTP association pool is out of service, the SCTP at the local end may notify the application protocol layer that this SCTP association is out of service after the SCTP at the local end detects that the SCTP association exits.

In S604, the respective application protocol layer of each of the first network node and the second network node deletes the SCTP association to be deleted from the activated association pool.

It is to be noted that for the distributed scenario, synchronization of the application protocol layer data is also required.

It can be understood that since multiple SCTP associations exist in the SCTP association pool, when an SCTP association is out of service due to a fault or a manual operation, signaling between network nodes may be transmitted via other available SCTP associations in the SCTP association pool, such that signaling interaction between network nodes is not affected. The SCTP association being out of service is deleted from the SCTP association pool through the technical solution shown in FIG. 6.

Exemplarily, due to maintenance or service demands of the application layer, in some possible cases, one or more SCTP associations in the SCTP association pool need to be blocked, and transmission of new signaling via these SCTP associations is prohibited. Therefore, referring to FIG. 7, the technical solution shown in FIG. 1 may also include steps described below.

In S701, the first network node sends an update request message to the second network node. This update request message instructs to block one or more SCTP associations corresponding to the update request message.

In S702, the second network node replies an update request response message to the first network node.

Specifically, for SCTP associations in the SCTP association pool established in the scheme 1 shown in FIG. 3, the SCTP associations to be blocked may be used for sending the update request message and the update request response message; and for SCTP associations in the SCTP association pool established in the scheme 2 shown in FIG. 4, identifiers of the SCTP associations to be blocked may be carried in the update request message and the update request response message. At this point, the SCTP association for transmitting the update request message and the update request response message may be randomly selected from the SCTP association pool.

In S703, the respective application protocol layer of each of the first network node and the second network node updates the SCTP associations to be blocked in the SCTP association pool to a blocked state, and no blocked SCTP association is selected when the application protocol layer sends signaling subsequently.

Figure 6:
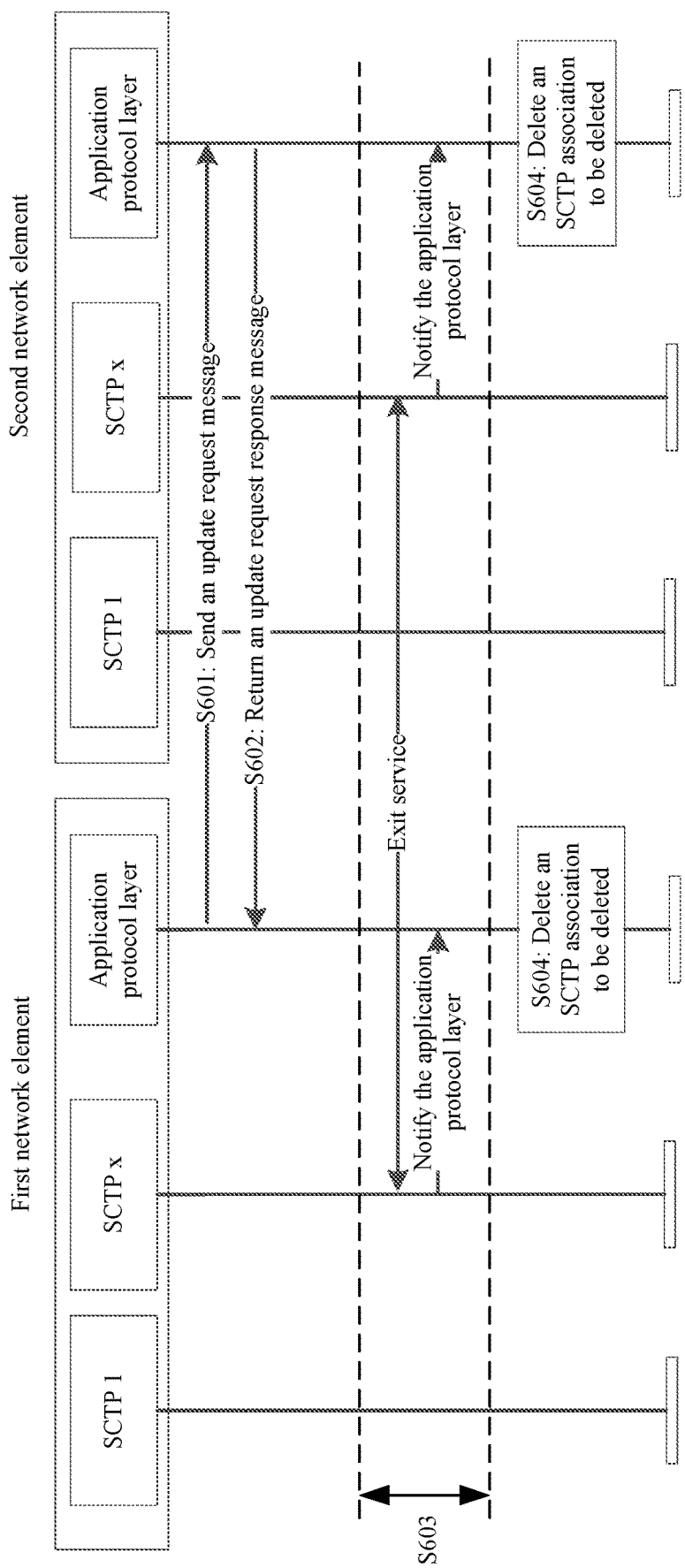
FIG. 6 is a schematic diagram of a process of an SCTP association being out of service according to an embodiment of the present invention.
Figure 7:
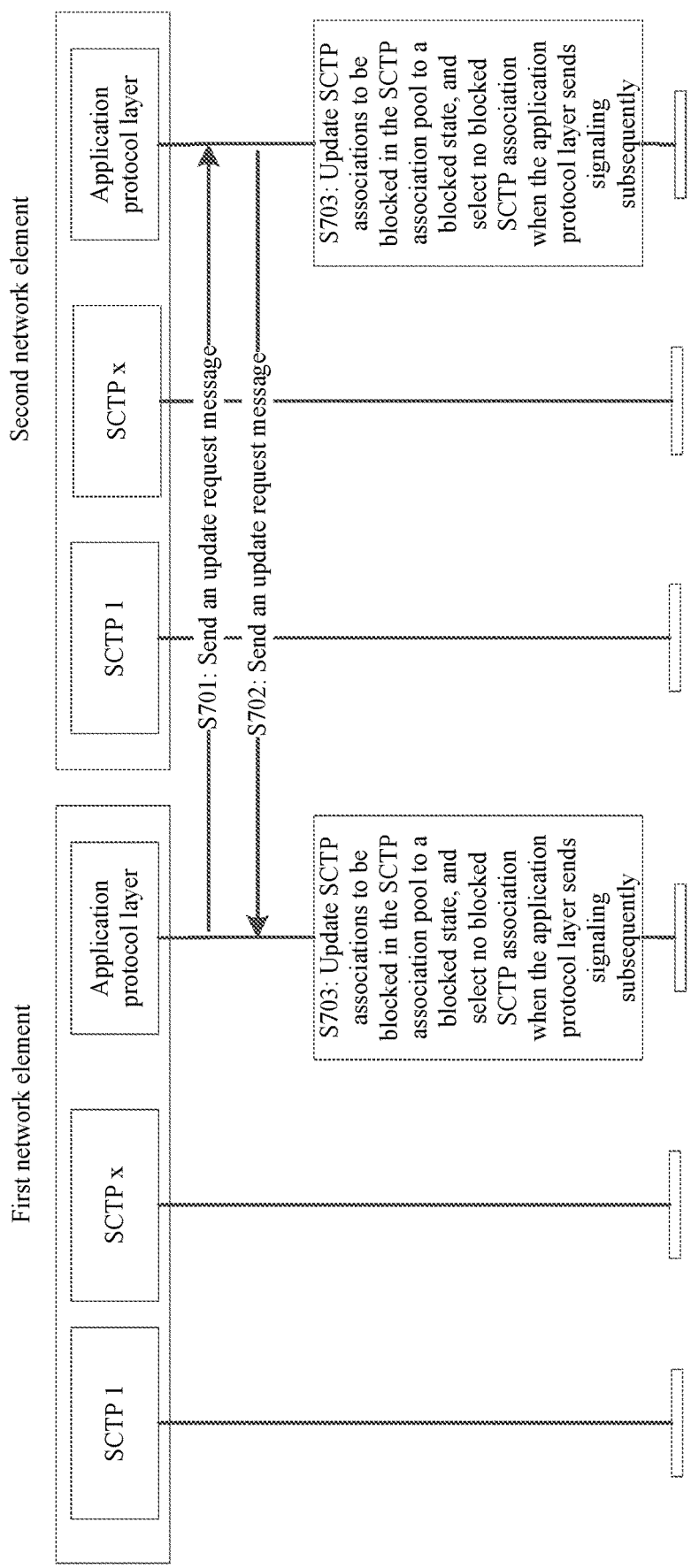
FIG. 7 is a schematic diagram of a process of blocking an SCTP association according to an embodiment of the present invention.

In conjunction with both the SCTP association exiting service process shown in FIG. 6 and the SCTP association blocking process shown in FIG. 7, an association may be dynamically deleted and without affecting the transmission of the application protocol layer signaling.

Figure 8:
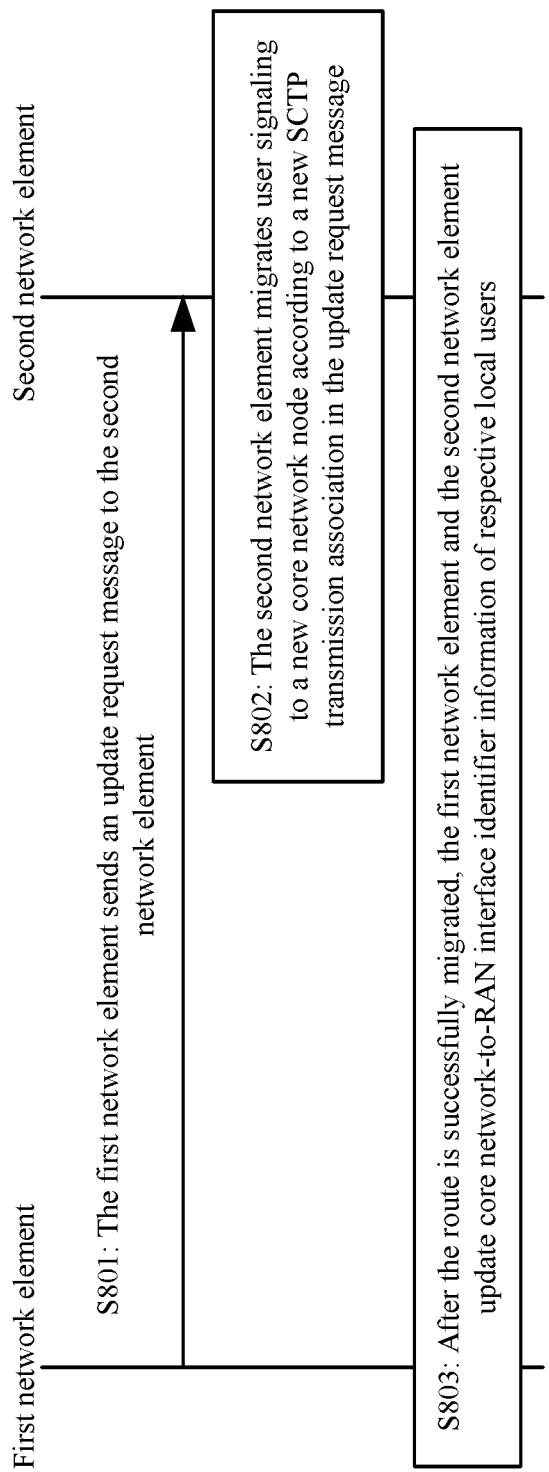
FIG. 8 is a schematic diagram of a process of reselecting an SCTP association according to an embodiment of the present invention.

Exemplarily, when the SCTP association needs to be reelected, referring to FIG. 8, the technical solution shown in FIG. 1 may also include steps described below.

In S801, the first network node sends an update request message to the second network node. The update request message is used for instructing to reselect an SCTP association.

The update request message is used for updating a user route to a new SCTP association. The update request message includes related information indicting the new SCTP association, such as a list of user information, an identifier of the new SCTP association, or an identifier of a new first network node. The user information may be a user application identifier pair of the first network node and the second network node.

In S802, the second network node migrates user signaling to a new core network node according to the new SCTP association in the update request message.

In S803, after the route is migrated successfully, the first network node and the second network node update core network-to-RAN interface identifier information of respective local users.

Figure 9:
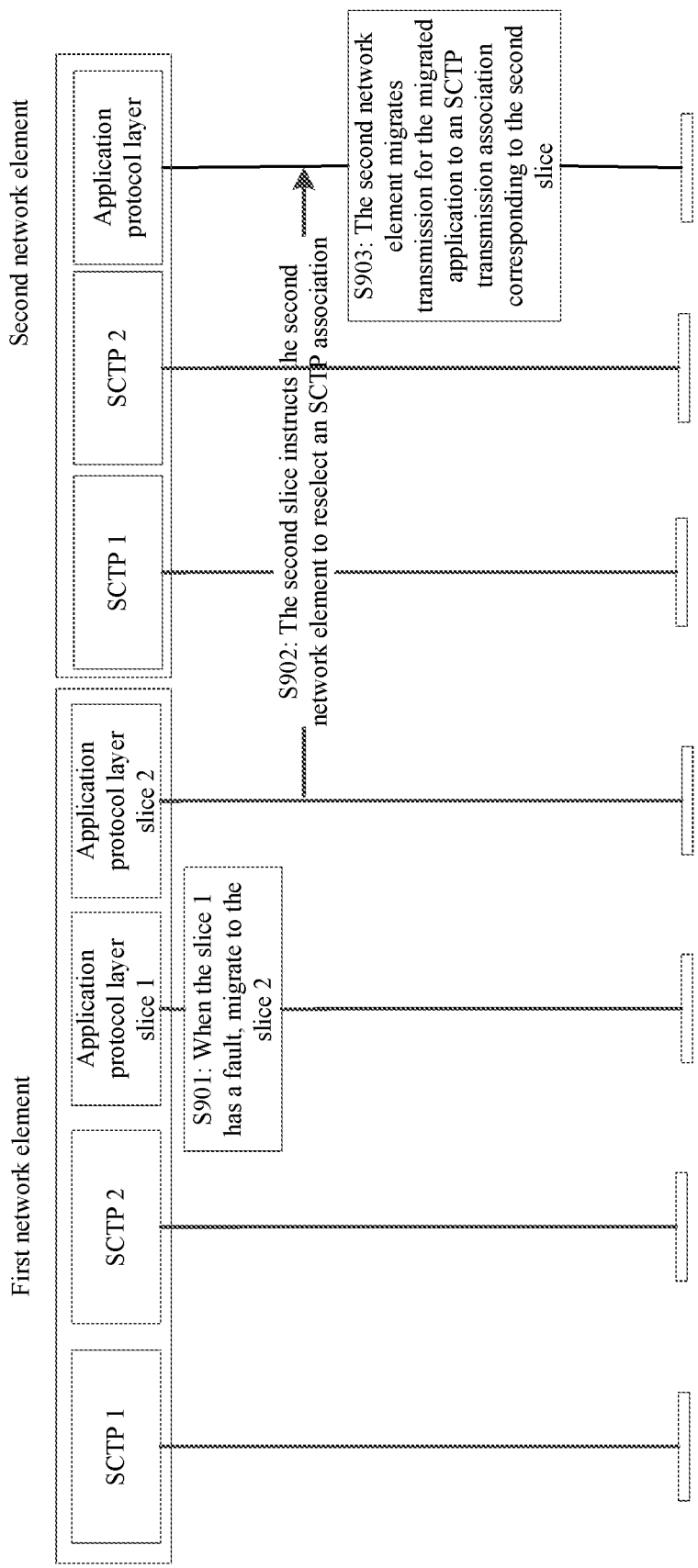
FIG. 9 is a schematic diagram of another process of reselecting an SCTP association according to an embodiment of the present invention.

It is to be noted that for multiple elastic slices with identical functions in the distributed network node, when elastic scaling needs to be performed, a slice needs to be deleted; however, for a network node with a (special) requirement, such as a wireless core network node, the opposite-end network node needs to be notified to block corresponding SCTP associations, so as to avoid the entry of a new user; and for an application with established context, the opposite-end network node possibly needs to be notified to change the SCTP association, and the context within the network node is migrated through the application. In addition, if the first network node has internal migration caused by a software or hardware fault of a slice and needs to migrate to one or more new slices, the second network node needs to be notified to switch a path. The path switch may be implemented through a message notification at a slice level or a user level. At this point, the process of reselecting the SCTP association is shown in FIG. 9.

In S901, when a first slice of the first network node has a fault and is out of service, an application protocol layer migrates an application to a second slice.

It can be understood that the second slice may be a one or more slices other than the first slice, and no further detail is repeated in this embodiment.

In S902, the second slice instructs the second network node to reselect an SCTP association.

In S903, the second network node migrates transmission for the migrated application to an SCTP association corresponding to the second slice; or in consideration of the demand for elastic scaling, in a condition of low load, after the first network node deletes the first slice, the application protocol layer of the first slice actively instructs the second network node to reselect the second slice for the connection of a user or an application corresponding to the first slice, and the second network node migrates transmission for the migrated application to an SCTP association corresponding to the second slice.

This embodiment provides a communication method supporting multiple SCTP associations, in which an SCTP association pool including multiple SCTP associations is established between the first network node and the second network node and a service is provided for the signaling transmission between network nodes via the SCTP association pool. The communication method can not only provide a highly reliable transmission service for the network nodes, but also support seamless migration of hot backup of the network nodes. In addition, a detour of control signaling and a single point of a protocol stack can be avoided when the network nodes are deployed in a geographically distributed manner.

Embodiment 2

Based on the same technical concept described in the foregoing embodiment, specific implementation of the technical solutions in the foregoing embodiment is described in two application scenarios in this embodiment.

Scenario 1

Figure 10:
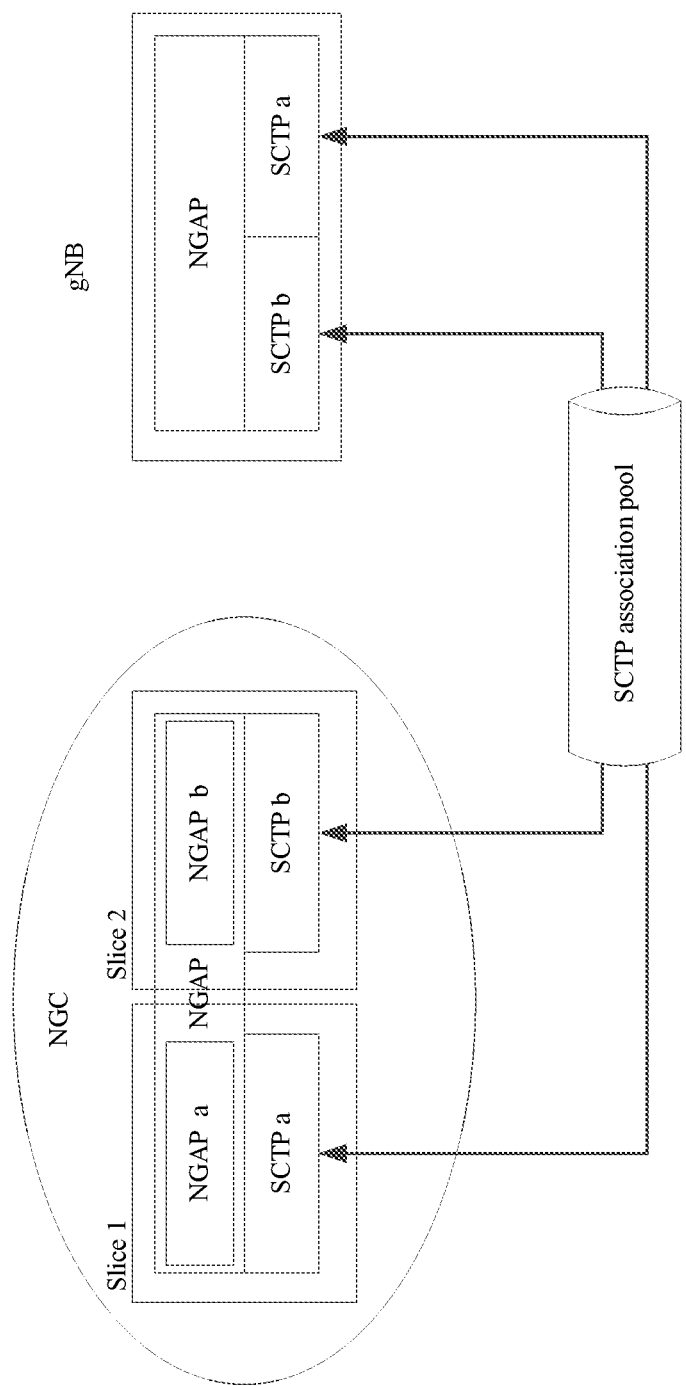
FIG. 10 is a schematic diagram of an architecture in a scenario one according to an embodiment of the present invention.

Referring to the schematic diagram of a scenario architecture shown in FIG. 10, the scenario describes a scheme of deploying an SCTP association pool between a core network and a base station in 5G, i.e., a scheme of deploying an association pool between a next generation core network (NGC) and a gNodeB (gNB). As shown in FIG. 10, the NGC is a network node deployed in a distributed manner, which supports multiple slices. The scenario lists only two slices by way of example. The slices of the NGC may be two parts with independent functions, each being capable of performing communication with the outside independently. A data synchronization channel is provided internally between the slices for realizing disaster tolerance and context migration.

Hot backup may be realized between the slices. When the slice 1 has a fault, the slice 2 may replace the slice 1 to continue to provide services. In this example, application protocol layers, which are connected to the gNB, of two NGC slices are referred to as an NGAP a and an NGAP b respectively. The gNB supports the SCTP association pool, and is externally embodied as a complete gNB. The SCTP association pool of the gNB includes two SCTP associations, which are referred to as SCTP a and SCTP b in this scenario. Based on the scenario shown in FIG. 10, the specific implementation process of the technical solutions of the foregoing embodiment is as follows.

Figure 11:
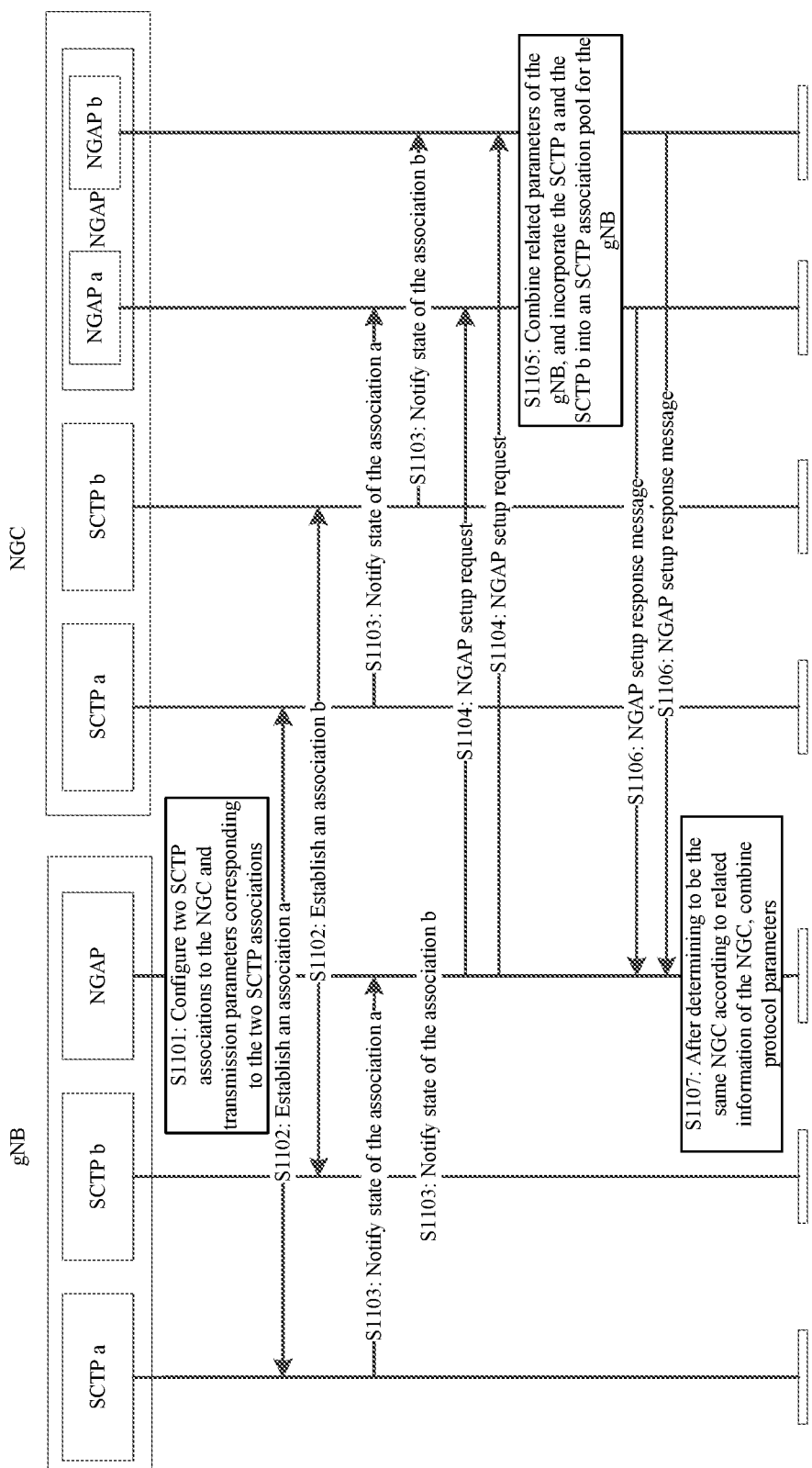
FIG. 11 is a schematic diagram one of a process of establishing an association pool in the scenario one according to an embodiment of the present invention.

1. For the SCTP association pool setup process, according to the scheme 1 described in the foregoing embodiments, referring to FIG. 11, the procedure of establishing the SCTP association pool in this scenario may include steps described below.

In S1101, the gNB configures two SCTP associations to the NGC and transmission parameters corresponding to the two SCTP associations.

In S1102, the SCTP a and the SCTP b respectively initiate an SCTP association setup process and establish two SCTP associations between network nodes.

In S1103, two SCTP associations of the gNB and the NGC, i.e., the SCTP a and the SCTP b, notify a respective protocol NGAP layer of each of the gNB and the NGC that the association is successfully established.

In S1104, the protocol NGAP layer of the gNB initiates NGAP setup request messages to the NGC via the SCTP a and the SCTP b respectively.

The NGAP setup request message carries related parameters of the gNB, such as a gNB ID, and is added with optional slice selection information.

In S1105, after the NGC receives the NGAP setup request messages from the two SCTP associations and determines that the NGAP setup request messages are two NGAP setup requests of the same gNB according to the gNB IDs in the messages, the NGC combines the related parameters of the gNB, and incorporates the SCTP a and the SCTP b into an SCTP association pool for the gNB.

In S1106, the NGC sends NGAP setup response messages to the gNB via the SCTP a and the SCTP b respectively.

It is to be noted that the slice selection information needs to be added in the NGAP setup response message.

In S1107, after the gNB receives the NGAP setup response messages and determines that the NGAP setup response messages come from the same NGC according to related information of the NGC, the gNB combines protocol parameters and incorporates the SCTP a and the SCTP b into a transmission association pool for the NGC.

It can be understood that the gNB and the NGC simultaneously maintain SCTP association priorities and round-trip time information in the SCTP association pool, which may be realized and determined by the gNB and the NGC.

Figure 12:
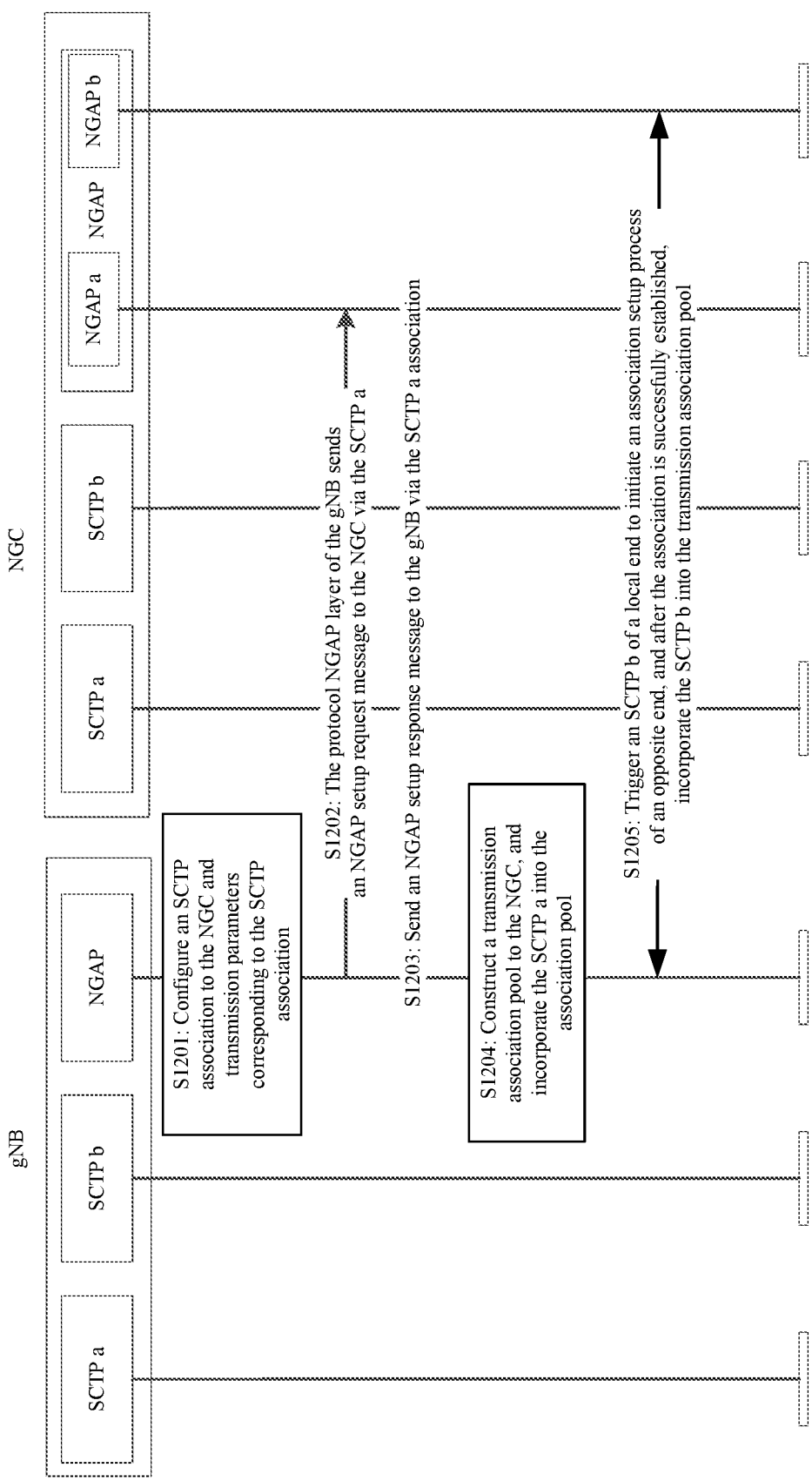
FIG. 12 is a schematic diagram two of a process of establishing an association pool in the scenario one according to an embodiment of the present invention.

2. For the SCTP association pool setup process, according to the scheme 2 described in the foregoing embodiments, referring to FIG. 12, the procedure of establishing the SCTP association pool in this scenario may include steps described below.

In S1201, the gNB configures an SCTP association to the NGC and transmission parameters corresponding to the SCTP association.

For example, the SCTP a initiates an association setup process and establishes two SCTP associations between network nodes, and the SCTP a of each of the gNB and the NGC notifies a respective protocol NGAP layer of the each of the gNB and the NGC that the association is successfully established.

In S1202, the protocol NGAP layer of the gNB sends an NGAP setup request message to the NGC via the SCTP a.

The NGAP setup request message carries related parameters of the gNB, such as a gNB ID, and is added with optional slice selection information and an optional SCTP association parameter list. The list may include an IP tetrad, a port identifier and an SCTP association identifier.

In S1203, after the NGC receives the NGAP setup request message and determines that an initial association pool of the gNB contains the SCTP a according to the gNB ID in the message, the NGC sends an NGAP setup response message to the gNB via an SCTP a association.

It is to be noted that the NGAP setup request message needs to carry an optional SCTP association parameter list which mainly includes an IP tetrad, a port identifier, an SCTP association identifier and slice selection information.

In S1204, the gNB receives the NGAP setup response message, constructs a transmission association pool for the NGC, and incorporates the SCTP a into the association pool.

In S1205, one or each of the NGC and the gNB, according to the SCTP association parameter list, triggers an SCTP b of a local end to initiate an association setup process of an opposite end, and after the association is successfully established, the NGC and the gNB incorporate the SCTP b into the transmission association pool.

Figure 13:
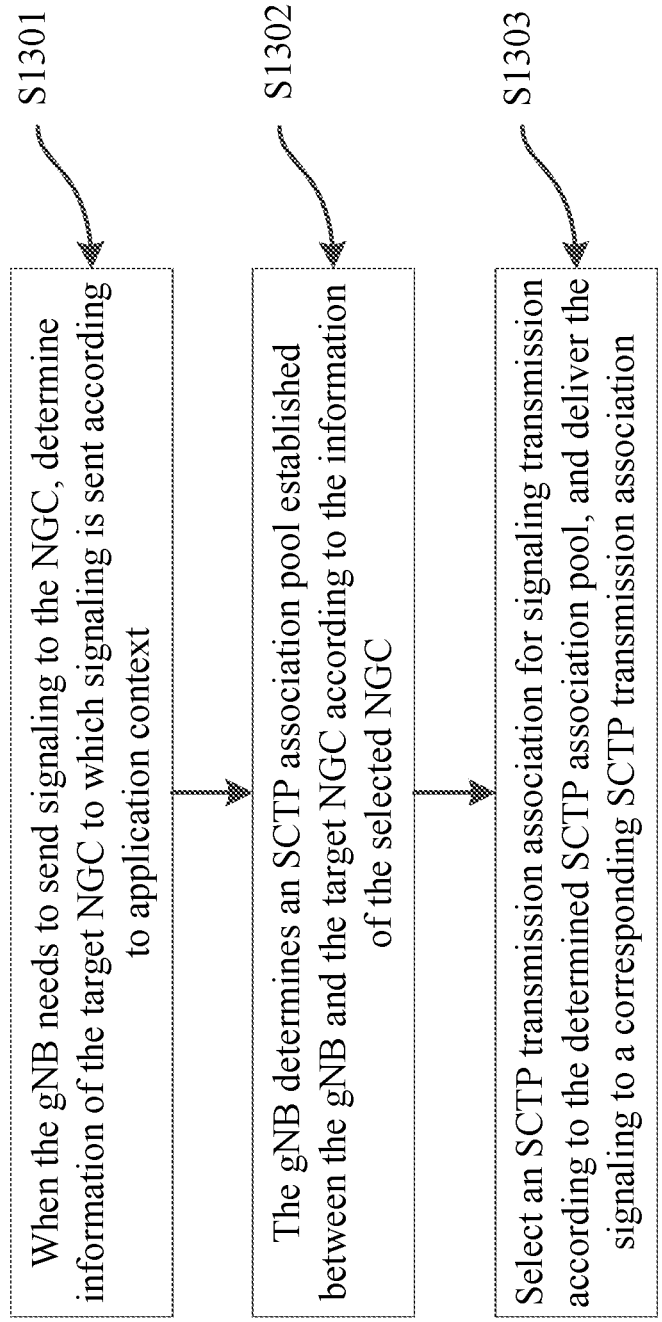
FIG. 13 is a schematic diagram one of a process of selecting an SCTP association in the scenario one according to an embodiment of the present invention.

3. For the process of selecting the SCTP association from the SCTP association pool, specifically, the process in which the gNB selects the SCTP association to transmit signaling to the NGC is as shown in FIG. 13 and may include steps described below.

In S1301, when the gNB needs to send signaling to the NGC, the gNB determines information of the target NGC to which the signaling is sent according to application context.

In S1302, the gNB determines an SCTP association pool established between the gNB and the target NGC according to the information of the selected NGC.

In S1303, an SCTP association for signaling transmission is selected according to the determined SCTP association pool, and the signaling is delivered to a corresponding SCTP association.

Specifically, the implementation of S1303 is as described in FIG. 5, and details are not repeated herein.

Figure 14:
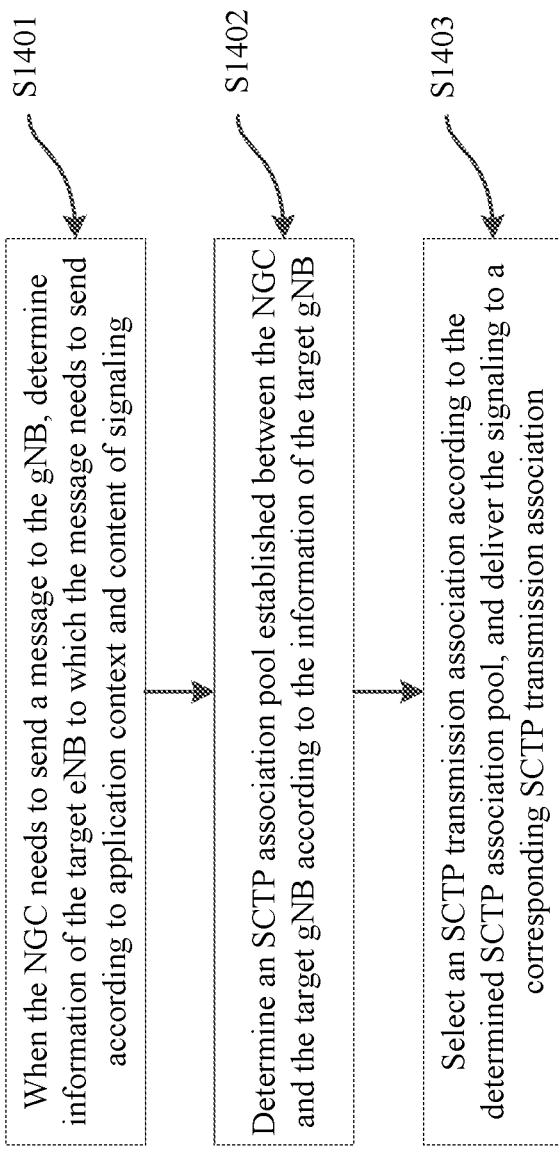
FIG. 14 is a schematic diagram two of a process of selecting an SCTP association in the scenario one according to an embodiment of the present invention.

4. For the process of selecting the SCTP association from the SCTP association pool, specifically, the process in which the NGC selects the SCTP association for the gNB to transmit signaling is as shown in FIG. 14.

In S1401, when the NGC needs to send a message to the gNB, the NGC determines information of the target eNB that the message needs to send according to application context and content of signaling.

In S1402, an SCTP association pool established between the NGC and the target gNB is determined according to the information of the target gNB.

In S1403, an SCTP association for signaling transmission is selected according to the determined SCTP association pool, and the signaling is delivered to a corresponding SCTP association.

Specifically, the implementation of S1403 is as described in FIG. 5, and details are not repeated herein.

For schemes shown in FIGS. 13 and 14, it is to be noted that for non-user equipment (UE) level signaling, since each of the gNB and the NGC knows the peer network node to which the signaling needs to be sent, the association is selected in the above manner according to the target network node, and details are not repeated herein.

However, for UE level signaling, the gNB or the NGC may have a viscosity requirement, that is, after the UE accesses a certain slice, the UE expects to stay in this slice as much as possible. For this case, the above selection manner is only suitable to the case in which no logic connection is established for the UE between the gNB and the NGC; while for the UE with a logic connection, the gNB and the NGC need to save the SCTP association selected this time for subsequent signaling transmission until the logic connection is released or reselected.

Figure 15:
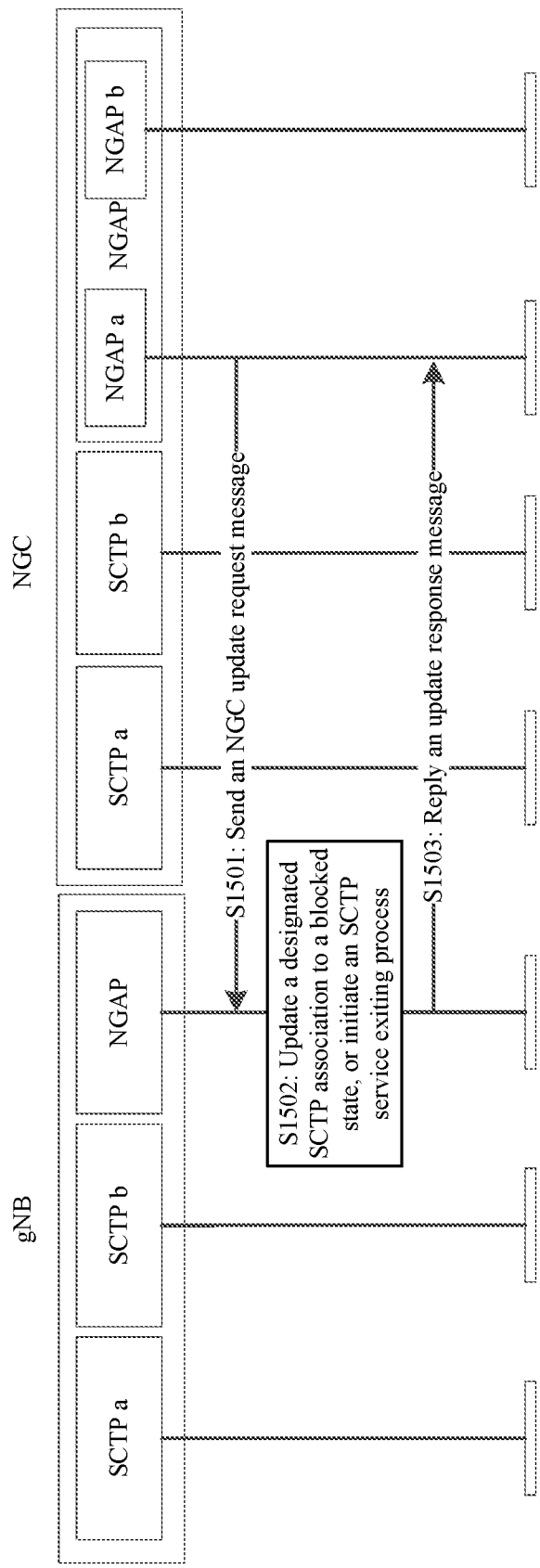
FIG. 15 is a schematic diagram of a process of blocking and deleting an SCTP association in the scenario one according to an embodiment of the present invention.

5. The process of blocking and deleting an SCTP association is as shown in FIG. 15.

In S1501, when the NGC or the gNB needs to delete or block an SCTP association or when an SCTP association breaks abnormally, a slice of an initiating end notifies a peer network node.

Specifically, if initiation is performed by the NGC, an NGC update request message is sent to the gNB, while if initiation is performed by the gNB, a gNB update request message is sent to the NGC. The message carries a list of at least one designated SCTP association, and this list includes identifiers of the designated SCTP association and operation indication for the designated SCTP association, such as deletion, blocking and the like. In FIG. 15, the specific process is described using initiation performed by the NGC as an example.

In S1502, after the NGC receives the gNB update request message or the gNB receives the NGC update request message of the NGC, the designated SCTP association is updated to a blocked state, or an SCTP service exiting process is initiated.

In S1503, the NGC replies a gNB update response message to the gNB, or the gNB replies an NGC update response message to the NGC.

Figure 16:
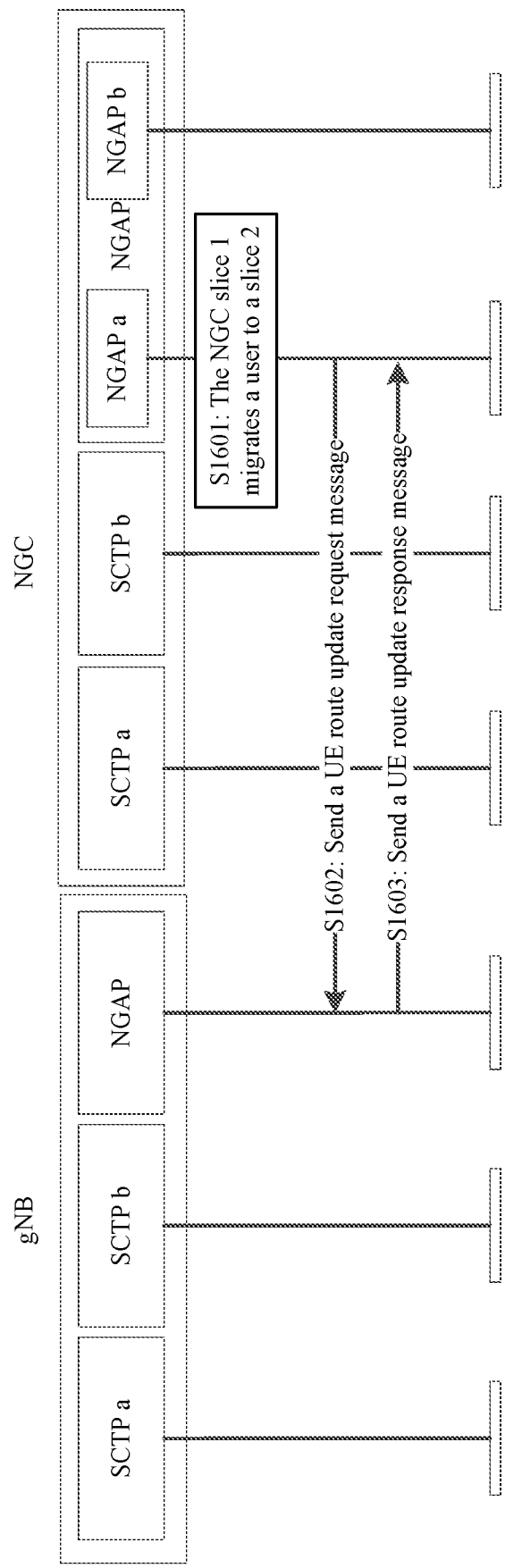
FIG. 16 is a schematic diagram of a process of reselecting an SCTP association in the scenario one according to an embodiment of the present invention.

6. For the SCTP association reselection procedure, assuming that a slice 1 of the NGC needs to be deleted, as shown in FIG. 16, the procedure may include steps described below.

In S1601, the slice 1 of the NGC migrates a user to a slice 2.

In S1602, the slice 1 of the NGC sends a UE route update request message to the gNB.

This message carries an identifier of an updated SCTP association, an identifier of a target SCTP association and an information list of UE identifiers with a route to be updated. This list may mainly include a gNB UE NGAP ID and an NGC UE NGAP ID.

In S1603, after the gNB receives the UE route update request message, the gNB updates information designated by the UE identifier, at the same time, sets a state of the updated SCTP association to a blocked state, and sends a UE route update response message to the NGC.

Similarly, the gNB may also ask the NGC to update information of the SCTP association of a local end and send the same message, and details are not repeated herein.

Scenario 2

Figure 17:
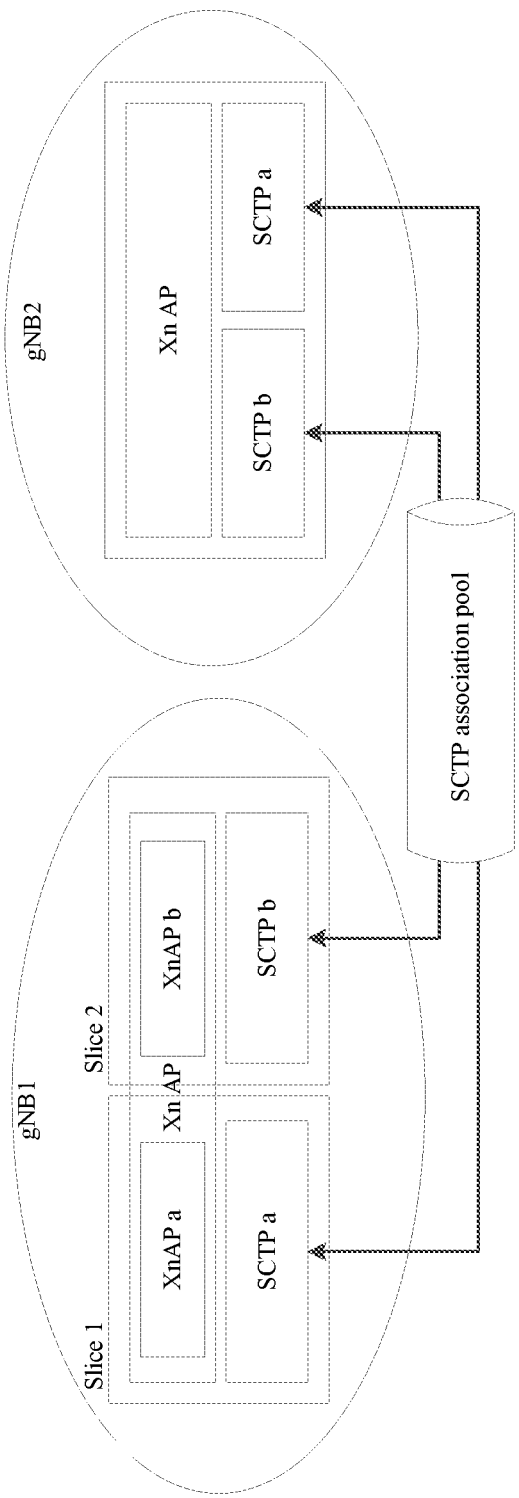
FIG. 17 is a schematic diagram of an architecture in a scenario two according to an embodiment of the present invention.

Referring to the schematic diagram of a scenario architecture shown in FIG. 17, this scenario describes a scheme of deploying an SCTP association pool between gNBs. As shown in FIG. 17, the gNB 1 is a base station supporting distribution. The gNB 1 includes two independent Xn application protocol (XnAP) function parts, which correspondingly are an XnAP a and an XnAP b. The gNB 1 and the gNB 2 support an SCTP association pool, and the SCTP pool has two associations, an SCTP a and an SCTP b.

Figure 18:
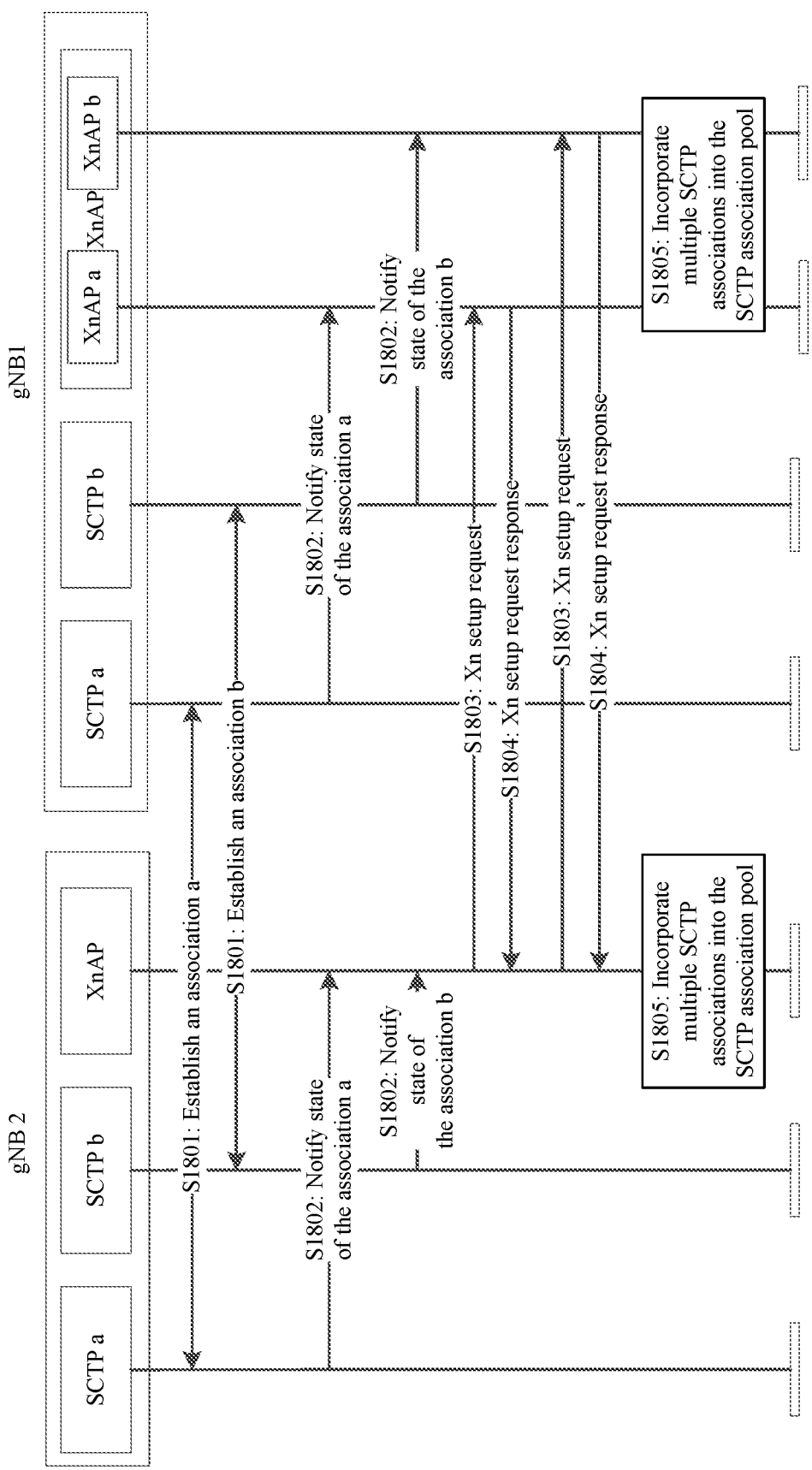
FIG. 18 is a schematic diagram one of a process of establishing an association pool in the scenario two according to an embodiment of the present invention.

1. For the SCTP association pool setup process, according to the scheme1 described in the foregoing embodiments, referring to FIG. 18, the procedure of establishing the SCTP association pool in this scenario may include steps described below.

In S1801, two gNBs configure SCTP transmission parameters and a network node type respectively, initiate an SCTP association setup respectively, and establish the SCTP a and the SCTP b.

In S1802, the respective SCTP a and SCTP b in each of the gNB a and the gNB b notifies an XnAP between gNBs that the SCTP associations are successfully established.

In S1803, the XnAP of the gNB 2 sends an Xn setup request message via each of the SCTP a and the SCTP b to establish an Xn connection.

Specifically, this message is added with an optional slice attribute.

In S1804, the gNB 1 replies an Xn setup response message to the gNB 2 via the association for receiving the message.

In S1805, after the gNB 1 determines that multiple SCTP associations correspond to the same gNB according to gNB identifiers in the received Xn setup request messages, the gNB 1 incorporates the multiple SCTP associations into the SCTP association pool; and after the gNB 2 determine multiple SCTP associations correspond to the same gNB according to gNB identifiers in the received Xn setup response messages, the gNB 2 incorporates the multiple SCTP associations into the SCTP association pool.

Figure 19:
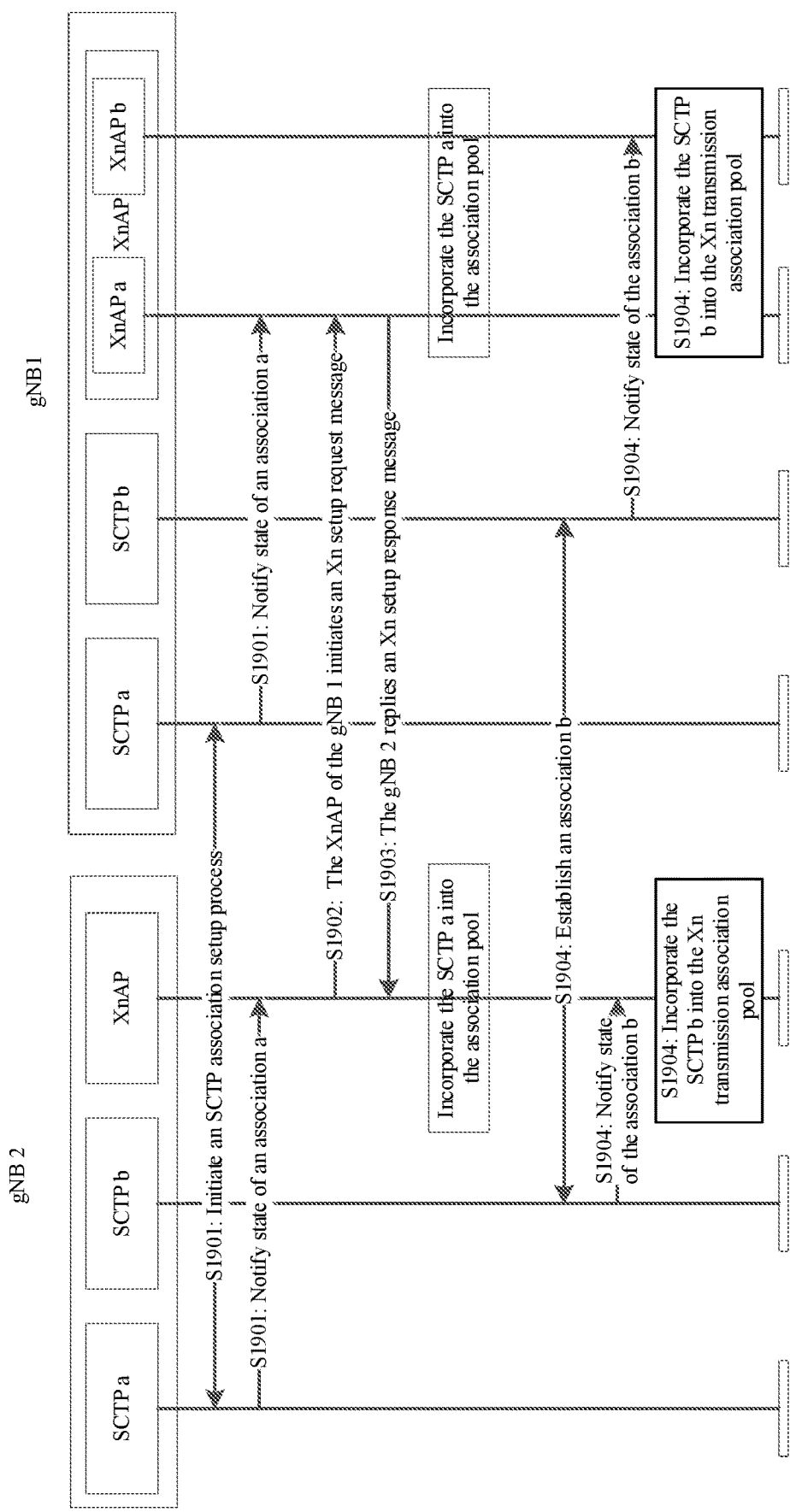
FIG. 19 is a schematic diagram two of a process of establishing an association pool in the scenario two according to an embodiment of the present invention.

2. For the SCTP association pool setup process, according to the scheme 2 described in the foregoing embodiments, referring to FIG. 19, the procedure of establishing the SCTP association pool in this scenario may include steps described below.

In S1901, an SCTP parameter is configured between the gNB 1 and the gNB 2 via OAM or self-organized networks (SON); an SCTP association setup process is initiated; and after the association is successfully established, each of the gNB 1 and the gNB 2 notifies an XnAP of a local end that the association is successfully established.

In S1902, the XnAP of the gNB 1 initiates an Xn setup request message.

This message is added with a list of slice SCTP parameters used by the local end for transmission. This list mainly includes an association identifier, an IP, a port and a slice attribute.

In S1903, the gNB 2 replies an Xn setup response message.

This message also includes a list of SCTP parameters used by the local end for transmission.

The gNB 1 and the gNB 2 respectively use the SCTP a as an Xn transmission association pool between the gNB 1 and the gNB 2.

In S1904, the gNB 1 and the gNB 2 initiate the SCTP setup according to the list of SCTP parameters respectively, the SCTP b is successfully established, and the SCTP b is added in the Xn transmission association pool.

Figure 20:
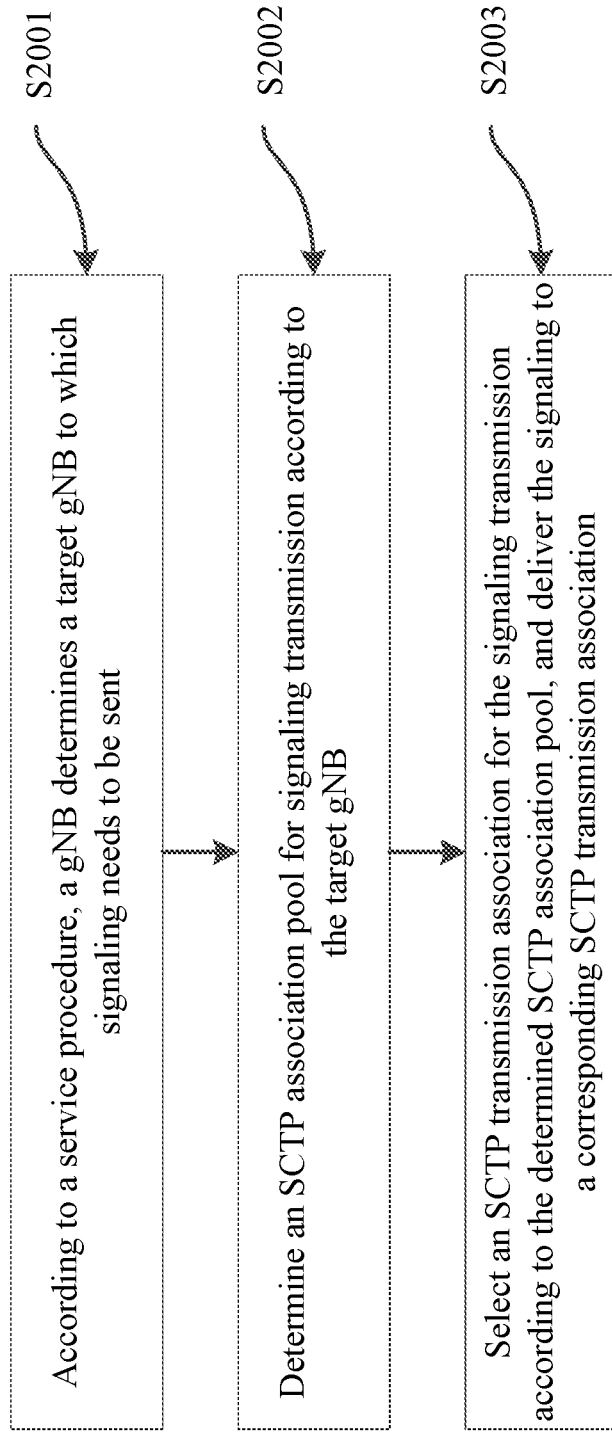
FIG. 20 is a schematic diagram of a process of selecting an SCTP association in the scenario one according to an embodiment of the present invention.

3. The process of selecting the SCTP association from the SCTP association pool is as shown in FIG. 20, and may include steps described below.

In S2001, according to a service procedure, a gNB determines a target gNB to which signaling needs to be sent.

In S2002, an SCTP association pool for signaling transmission is determined according to the target gNB.

In S2003, an SCTP association for the signaling transmission is selected according to the determined SCTP association pool, and the signaling is delivered to a corresponding SCTP association.

Specifically, the implementation of S2003 is as described in FIG. 5, and details are not repeated herein.

4. The manner of blocking and deleting an SCTP association is similar to the procedure in the scenario 1, and only a list of SCTP associations and an operation indication of each association need to be added in the Xn update request message.

Similarly, for the reselection of the SCTP association, the Xn UE route update request/response message also needs to be added, and an identifier of an updated transmission association, an identifier of a target transmission association and an information list of UE identifiers with a route to be updated are added and carried in the Xn UE route update request message. This list contains gNB Xn UEAP IDs of both ends.

Through the detail descriptions of the technical solution of the embodiment 1 in the above two scenarios, it can be understood that, by providing a service for the signaling transmission between network nodes via the SCTP association pool, not only a highly reliable transmission service is provided for the network nodes, but also seamless migration of hot backup of the network nodes is supported; in addition, a detour of control signaling and a single point of a protocol stack are avoided when the network nodes are deployed in a geographically distributed manner.

Embodiment 3

Figure 21:
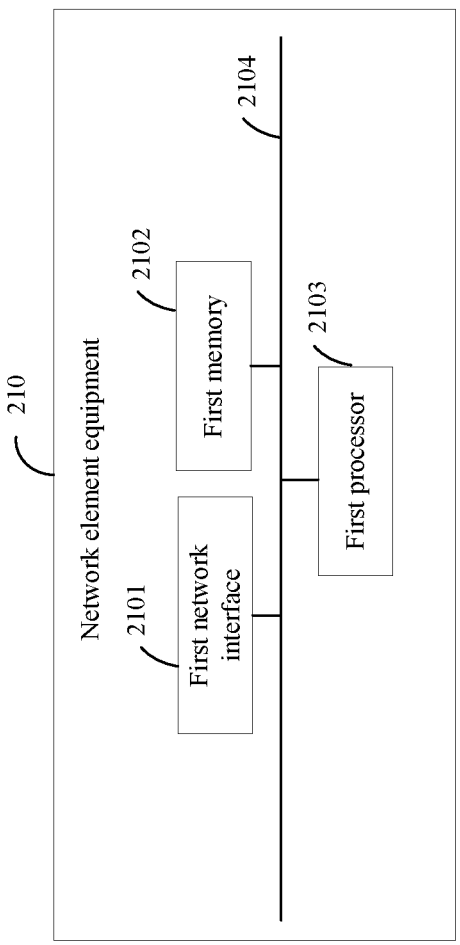
FIG. 21 is a structural diagram of a network node equipment according to an embodiment of the present invention.

Based on the same technical concept described in the foregoing embodiments, FIG. 21 shows a network node equipment 210 provided by an embodiment of the present invention. This network node equipment 210 may be a first network node differentiated from a second network node. The network node equipment 210 includes a first network interface 2101, a first memory 2102 and a first processor 2103. All components are coupled together via a bus system 2104. It can be understood that the bus system 2104 is configured to implement connection communications among these components. In addition to a data bus, the bus system 2104 further includes a power bus, a control bus and a state signal bus. However, for the sake of clarity, various buses are all marked as the bus system 2104 in FIG. 21.

The first network interface 2101 is configured to receive and send data in a process of information transceiving with other external network nodes.

The first memory 2102 is configured to store computer programs executable on the first processor 2103.

The first processor 2103 is configured to, when executing the computer programs, preform: establishing an SCTP association pool with the second network node, where the SCTP association pool includes at least one SCTP association, selecting an SCTP association for signaling transmission from the SCTP association pool, and performing the signaling transmission with the second network node via the SCTP association.

It can be understood that the first memory 2102 in this embodiment of the present invention may be a volatile memory or a non-volatile memory, or may include both the volatile memory and the non-volatile memory. The non-volatile memory may be a read only memory (ROM), a programmable rom (PROM), an erasable PROM (EPROM), an electrically EPROM (EEPROM) or a flash memory. The volatile memory may be a Random Access Memory (RAM), which serves as an external cache. By way of an illustrative description rather than a restrictive description, many forms of RAMs may be used, such as a static RAM (SRAM), a dynamic RAM (DRAM), a synchronous DRAM (SDRAM), a double data rate SDRAM (DDRSDRAM), an enhanced SDRAM (ESDRAM), a synclink DRAM (SLDRAM), and a direct rambus RAM (DRRAM). The first memory 2102 of the system and the method described herein is intended to include, but is not limited to, these and any other suitable types of memory.

The first processor 2103 may be an integrated circuit chip having a signal processing capability. In the implementation process, various steps of the methods described above may be performed by an integrated logic circuit of hardware or a software instruction in the first processor 2103. The first processor 2103 described above may be a general-purpose processor, a digital signal processor (DSP), an application specific integrated circuit (ASIC), a field-programmable gate array (FPGA) or other programmable logic device, discrete gates or transistor logic, or discrete hardware components. The first processor may implement or execute various methods, steps and logic block diagrams disclosed in the embodiments of the present invention. The general-purpose processor may be a microprocessor or any conventional processor. The steps of the methods disclosed in the embodiments of the present invention may be directly implemented by a hardware decoding processor, or may be implemented by a combination of hardware and software modules in the decoding processor. The software modules may be located at a RAM, a flash memory, a ROM, a PROM, an electrically erasable programmable memory, a register, or other established storage medium in the art. The storage medium is located in the first memory 2102. The first processor 2103 reads information in the first memory 2102 and implements the steps of the methods described above in combination with hardware of the processor.

It can be understood that these embodiments described in the present application may be implemented by hardware, software, firmware, middleware, microcode or a combination thereof. For a hardware implementation, the processing unit may be implemented within one or more ASICs, DSPs, DSP devices (DSPDs), programmable logic devices (PLDs), FPGAs, general-purpose processors, controllers, microcontrollers, microprocessors, other electronic units used for performing the functions described in the present application, or a combination thereof.

For a software implementation, the techniques described herein can be implemented with modules (e.g., procedures, functions, and so on) that perform the functions described herein. The software codes can be stored in memories and executed by processors. The memory may be implemented within or external to the processor.

In another embodiment, the first processor 2103 is further configured to, when executing the computer programs, perform: initiating an SCTP association setup process to an opposite end according to SCTP configuration data, merging application protocol layer data corresponding to SCTP associations for a same opposite end, and combining the SCTP associations for the same opposite end into a same activated association pool.

In another embodiment, the first processor 2103 is further configured to, when executing the computer programs, perform: establishing an initial SCTP association with the second network node, and performing signaling interaction via the initial SCTP association to add one or more SCTP associations.

In another embodiment, the first processor 2103 is further configured to, when executing the computer programs, perform: carrying information of the SCTP associations to be added in application protocol layer update process signaling.

In one embodiment, the application protocol layer update process signaling includes a core network configuration update message.

In another embodiment, the first processor 2103 is further configured to, when executing the computer programs, perform: carrying a list of information of the SCTP associations to be added in application protocol layer setup process signaling.

In another embodiment, the first processor 2103 is further configured to, when executing the computer programs, perform: selecting a candidate SCTP association set for the signaling transmission from the SCTP association pool, and selecting an SCTP association from the candidate SCTP association set as the SCTP association for the signaling transmission.

In another embodiment, the first processor 2103 is further configured to, when executing the computer programs, perform: selecting a candidate SCTP association set for the signaling transmission from the SCTP association pool, selecting at least one SCTP association with a high priority from the candidate SCTP association set to construct an optimal SCTP association set, and selecting an SCTP association from the optimal SCTP association set as the SCTP association for the signaling transmission.

In another embodiment, the first processor 2103 is further configured to, when executing the computer programs, perform: sending an update request message to the second network node, where the update request message instructs to delete one or more SCTP associations.

In another embodiment, the first processor 2103 is further configured to, when executing the computer programs, perform: receiving an update request response message sent by the second network node.

In another embodiment, the first processor 2103 is further configured to, when executing the computer programs, perform: sending an update request message to the second network node, where the update request message instructs to block one or more SCTP associations corresponding to the update request message, and receiving an update request response message replied by the second network node.

In another embodiment, the first processor 2103 is further configured to, when executing the computer programs, perform: sending an update request message to the second network node, where the update request message is used for instructing to reselect an SCTP association.

In another embodiment, the first processor 2103 is further configured to, when executing the computer programs, perform: when a first slice of the first network node has a fault and is out of service, migrating, by an application protocol layer, an application to a second slice.

Additionally, various components in this embodiment may be integrated into one processing unit, or each unit may be physically presented separately, or two or more units may be integrated into one unit. The integrated unit described above may be implemented by hardware or a software functional module.

The integrated unit may be stored in a computer-readable storage medium if implemented in the form of a software functional module but not sold or used as an independent product. Based on this understanding, the solution provided by the embodiment substantially, or the part contributing to the existing art, or all or part of the technical solution may be embodied in the form of a software product. The computer software product is stored in a storage medium and includes several instructions for enabling a computer device (which may be a personal computer, a server or a network device) or a processor to execute all or part of the steps in the method provided by the embodiment. The foregoing storage medium includes a USB disk, a mobile hard disk, a ROM, a RAM, a magnetic disk, an optical disk or another medium that can store program codes.

Therefore, this embodiment provides a computer-readable storage medium, which is configured to store computer programs. When executed by a processor, the computer programs perform: establishing an SCTP association pool with the second network node, where the SCTP association pool includes at least one SCTP associations, selecting an SCTP association for signaling transmission from the SCTP association pool, and performing the signaling transmission with the second network node via the SCTP association.

In another embodiment, when executed by a processor, the computer programs further perform: initiating an SCTP association setup process to an opposite end according to SCTP configuration data, merging application protocol layer data corresponding to SCTP associations for a same opposite end, and combining the SCTP associations for the same opposite end into a same activated association pool.

In another embodiment, when executed by a processor, the computer programs further perform: establishing an initial SCTP association with the second network node, and performing signaling interaction via the initial SCTP association to add one or more SCTP associations.

In another embodiment, when executed by a processor, the computer programs further perform: carrying a list of information of the SCTP associations to be added in application protocol layer update process signaling.

In one embodiment, the application protocol layer update process signaling includes a core network configuration update message.

In another embodiment, when executed by a processor, the computer programs further perform: carrying a list of information of the SCTP associations to be added in application protocol layer setup process signaling.

In another embodiment, when executed by a processor, the computer programs further perform: selecting a candidate SCTP association set for the signaling transmission from the SCTP association pool, and selecting an SCTP association from the candidate SCTP association set as the SCTP association for the signaling transmission.

In another embodiment, when executed by a processor, the computer programs further perform: selecting a candidate SCTP association set for the signaling transmission from the SCTP association pool, selecting at least one SCTP association with a high priority from the candidate SCTP association set to construct an optimal SCTP association set, and selecting an SCTP association from the optimal SCTP association set as the SCTP association for the signaling transmission.

In another embodiment, when executed by a processor, the computer programs further perform: sending an update request message to the second network node, where the update request message instructs to delete one or more SCTP associations.

In another embodiment, when executed by a processor, the computer programs further perform: receiving an update request response message sent by the second network node.

In another embodiment, when executed by a processor, the computer programs further perform: sending an update request message to the second network node, where the update request message instructs to block one or more SCTP associations corresponding to the update request message, and receiving an update request response message replied by the second network node.

In another embodiment, when executed by a processor, the computer programs further perform: sending, by the first network node, an update request message to the second network node, where the update request message is used for instructing to reselect an SCTP association.

In another embodiment, when executed by a processor, the computer programs further perform: when a first slice of the first network node has a fault and is out of service, migrating, by an application protocol layer, an application to a second slice.

Embodiment 4

Figure 22:
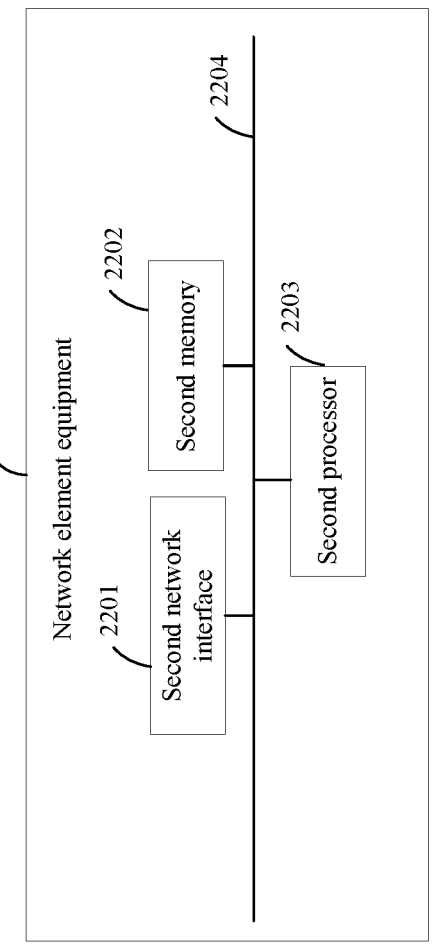
FIG. 22 is a structural diagram of another network node equipment according to an embodiment of the present invention.

Based on the same technical concept described in the foregoing embodiments, FIG. 22 shows a network node equipment 220 provided by an embodiment of the present invention. This network node equipment 210 may be a second network node differentiated from a first network node. The network node equipment 220 includes a second network interface 2201, a second memory 2202 and a second processor 2203. All components are coupled together via a bus system 2204. It can be understood that the bus system 2204 is configured to implement connection communications among these components. In addition to a data bus, the bus system 2204 further includes a power bus, a control bus and a state signal bus. However, for the sake of clarity, various buses are all marked as the bus system 2204 in FIG. 22.

The second network interface 2201 is configured to receive and send data in a process of information transceiving with other external network nodes.

The second memory 2202 is configured to store computer programs executable on the second processor 2203.

The second processor 2203 is configured to, when executing the computer programs, preform: establishing an SCTP association pool with the first network node, where the SCTP association pool includes at least one SCTP association, and receiving signaling transmitted by the first network node via an SCTP association, where the SCTP association is selected by the first network node.

It can be understood that the second memory 2202 in this embodiment of the present invention may be a volatile memory or a non-volatile memory, or may include both the volatile memory and the non-volatile memory. The non-volatile memory may be a ROM, a PROM, an EPROM, an EEPROM or a flash memory. The volatile memory may be a RAM, which serves as an external cache. By way of an illustrative description rather than a restrictive description, many forms of RAMs may be used, such as an SRAM, a DRAM, an SDRAM, a DDRSDRAM, an ESDRAM, an SLDRAM and a DRRAM. The second memory 2202 of the system and the method described herein is intended to include, but is not limited to, these and any other suitable types of memory.

The second processor 2203 may be an integrated circuit chip having a signal processing capability. In the implementation process, various steps of the methods described above may be performed by an integrated logic circuit of hardware or a software instruction in the second processor 2203. The second processor 2203 described above may be a general-purpose processor, a DSP, an ASIC, an FPGA or other programmable logic device, discrete gates or transistor logic, or discrete hardware components. The second processor may implement or execute various methods, steps and logic block diagrams disclosed in the embodiments of the present invention. The general-purpose processor may be a microprocessor or any conventional processor. The steps of the methods disclosed in the embodiments of the present invention may be directly implemented by a hardware decoding processor, or may be implemented by a combination of hardware and software modules in the decoding processor. The software modules may be located at a RAM, a flash memory, a ROM, a PROM, an electrically erasable programmable memory, a register, or other established storage medium in the art. The storage medium is located in the second memory 2202. The second processor 2203 reads information in the second memory 2202 and implements the steps of the methods described above in combination with hardware of the processor.

It can be understood that these embodiments described herein may be implemented by hardware, software, firmware, middleware, microcode or a combination thereof. For a hardware implementation, the processing unit may be implemented within one or more ASICs, DSPs, DSPDs, PLDs, FPGAs, general-purpose processors, controllers, microcontrollers, microprocessors, other electronic units used for performing the functions described in the present application, or a combination thereof.

For a software implementation, the techniques described herein can be implemented with modules (e.g., procedures, functions, and so on) that perform the functions described herein. The software codes can be stored in memories and executed by processors. The memory may be implemented within or external to the processor.

In another embodiment, the second processor 2203 is further configured to, when executing the computer programs, perform: initiating an SCTP association setup process to an opposite end according to SCTP configuration data, merging application protocol layer data corresponding to SCTP associations for a same opposite end, and combining the SCTP associations for the same opposite end into a same activated association pool.

In another embodiment, the second processor 2203 is further configured to, when executing the computer programs, perform: establishing an initial SCTP association with the first network node, and performing signaling interaction via the initial SCTP association to add one or more SCTP associations.

In another embodiment, the second processor 2203 is further configured to, when executing the computer programs, perform: carrying information of the SCTP associations to be added in application protocol layer update process signaling.

In one embodiment, the application protocol layer update process signaling includes a core network configuration update message.

In another embodiment, the second processor 2203 is further configured to, when executing the computer programs, perform: carrying a list of information of the SCTP associations to be added in application protocol layer setup process signaling.

In another embodiment, the second processor 2203 is further configured to, when executing the computer programs, perform: receiving an update request message sent by the first network node, where the update request message instructs to delete one or more SCTP associations.

In another embodiment, the second processor 2203 is further configured to, when executing the computer programs, perform: returning an update request response message to the first network node.

In another embodiment, the second processor 2203 is further configured to, when executing the computer programs, perform: receiving an update request message sent by the first network node, where the update request message instructs to block one or more SCTP associations corresponding to the update request message, and replying an update request response message to the first network node.

In another embodiment, the second processor 2203 is further configured to, when executing the computer programs, perform: receiving an update request message sent by the first network node, where the update request message is used for instructing to reselect an SCTP association.

In another embodiment, the second processor 2203 is further configured to, when executing the computer programs, perform: receiving a second slice notification message sent by the first network node, where the second slice notification message is used for instructing the second network node to reselect an SCTP association, and migrating transmission for a migrated application to an SCTP association corresponding to the second slice.

Additionally, various components in this embodiment may be integrated into one processing unit, or each unit may be physically presented separately, or two or more units may be integrated into one unit. The integrated unit described above may be implemented by hardware or a software functional module.

The integrated unit may be stored in a computer-readable storage medium if implemented in the form of a software functional module but not sold or used as an independent product. Based on this understanding, the solution provided by the embodiment substantially, or the part contributing to the existing art, or all or part of the technical solution may be embodied in the form of a software product. The computer software product is stored in a storage medium and includes several instructions for enabling a computer device (which may be a personal computer, a server or a network device) or a processor to execute all or part of the steps in the method provided by the embodiment. The foregoing storage medium includes a USB disk, a mobile hard disk, a ROM, a RAM, a magnetic disk, an optical disk or another medium that can store program codes.

Therefore, this embodiment provides a computer-readable storage medium, which is configured to store computer programs. When executed by a processor, the computer programs perform: establishing an SCTP association pool with the first network node, where the SCTP association pool includes at least one SCTP associations, and receiving signaling transmitted by the first network node via an SCTP association, where the SCTP association is selected by the first network node.

In another embodiment, when executed by a processor, the computer programs further perform: initiating an SCTP association setup process to an opposite end according to SCTP configuration data, merging application protocol layer data corresponding to SCTP associations for a same opposite end, and combining the SCTP associations for the same opposite end into a same activated association pool.

In another embodiment, when executed by a processor, the computer programs further perform: establishing an initial SCTP association with the first network node, and performing signaling interaction via the initial SCTP association to add one or more SCTP associations.

In another embodiment, when executed by a processor, the computer programs further perform: carrying information of the SCTP associations to be added in application protocol layer update process signaling.

In one embodiment, the application protocol layer update process signaling includes a core network configuration update message.

In another embodiment, when executed by a processor, the computer programs further perform: carrying a list of information of the SCTP associations to be added in application protocol layer setup process signaling.

In another embodiment, when executed by a processor, the computer programs further perform: receiving an update request message sent by the first network node, where the update request message instructs to delete one or more SCTP associations.

In another embodiment, when executed by a processor, the computer programs further perform: returning an update request response message to the first network node.

In another embodiment, when executed by a processor, the computer programs further perform: receiving an update request message sent by the first network node, where the update request message instructs to block one or more SCTP associations corresponding to the update request message, and replying an update request response message to the first network node.

In another embodiment, when executed by a processor, the computer programs further perform: receiving an update request message sent by the first network node, where the update request message is used for instructing to reselect an SCTP association.

In another embodiment, when executed by a processor, the computer programs further perform: receiving a second slice notification message sent by the first network node, where the second slice notification message is used for instructing the second network node to reselect an SCTP association, and migrating transmission for a migrated application to an SCTP association corresponding to the second slice.

Embodiment 5

Figure 23:
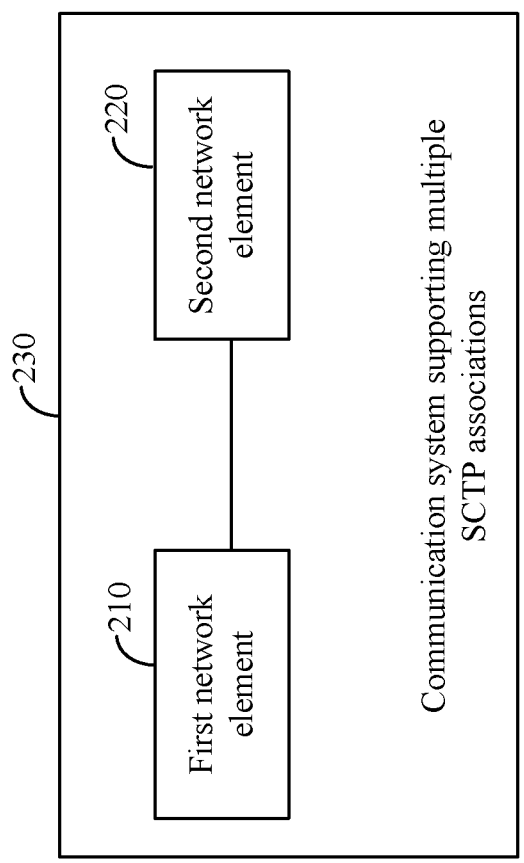
FIG. 23 is a structural diagram of a communication system supporting multiple SCTP associations according to an embodiment of the present invention.

Based on the same technical concept described in the foregoing embodiments, FIG. 23 shows a communication system 230 supporting multiple SCTP associations. The system 230 may include a first network node 210 and a second network node 220.

The first network node 210 is configured to establish an SCTP association pool with the second network node 220, where the SCTP association pool includes at least one SCTP association; select, from the SCTP association pool, an SCTP association for signaling transmission; and perform the signaling transmission with the second network node 220 via the SCTP association.

The second network node 220 is configured to establish an SCTP association pool with the first network node 210, where the SCTP association pool includes at least one SCTP association, and receive signaling transmitted by the first network node 210 via an SCTP association, where the SCTP association is selected by the first network node 210.

It is to be understood by those skilled in the art that the embodiments of the present invention may be provided as methods, systems, or computer program products. Therefore, the present invention may adopt a form of a hardware embodiment, a software embodiment, or a combination of hardware and software embodiments. In addition, the present invention may adopt a form of a computer program product implemented on one or more computer-usable storage medium (including, but not limited to, a disk memory, an optical memory and the like) which include computer-usable program codes.

The present invention is described with reference to flowcharts and/or block diagrams of methods, devices (systems) and computer program products according to the embodiments of the present invention. It is to be understood that computer program instructions may implement each flow and/or block in the flowcharts and/or block diagrams and a combination of flows and/or blocks in the flowcharts and/or block diagrams. These computer program instructions may be provided to a general-purpose computer, a special-purpose computer, an embedded processor or a processor of another programmable data processing device to produce a machine so that instructions executed by a computer or the processors of other programmable data processing devices produce the apparatus for implementing functions designated in one or more flows in the flowcharts and/or one or more blocks in the block diagrams.

These computer program instructions may also be stored in a computer-readable memory which can cause the computer or other programmable data processing devices to operate in a particular manner so that the instructions stored in the computer-readable memory produce a manufactured product including an instructing apparatus. The instructing apparatus implements the functions designated in the one or more flows in the flowcharts and/or the one or more blocks in the block diagrams.

These computer program instructions may also be loaded onto the computer or another programmable data processing device so that a series of operation steps are performed on the computer or another programmable device to produce processing implemented by the computer. Therefore, instructions executed on the computer or another programmable device provide steps for implementing the functions specified in one or more flows in the flowcharts and/or one or more blocks in the block diagrams.

The above are only preferred embodiments of the present invention and are not intended to limit the scope of the present invention.

INDUSTRIAL APPLICABILITY

In the technical solutions of the embodiments of the present invention, a signaling transmission service is performed through multiple SCTP associations between network nodes, greatly reducing the communication delay caused by the detour of control signaling.

We claim:

1. A communication method, comprising:
   establishing, by a first network node based on an initial stream control transmission protocol (SCTP) association, an SCTP association pool associating the first network node with a second network node;
   selecting, by the first network node, from the SCTP association pool, an SCTP association for first signaling transmission; and
   transmitting, by the first network node, the first signaling to the second network node via the selected SCTP association,
   wherein establishing the SCTP association pool comprises:
      establishing, by the first network node, the initial SCTP association associating the first network node with the second network node; and
      transmitting, by the first network node, second signaling to the second network node to add one or more SCTP associations to the initial SCTP association, the second signaling including application protocol layer update signaling carrying a list of the one or more SCTP associations to be added.

2. The communication method of claim 1, wherein the application protocol layer update signaling includes a core network configuration update message.

3. The communication method of claim 1, further comprising:
   sending, by the first network node, an update request message to the second network node, wherein the update request message includes instructions to delete one or more SCTP associations; and
   receiving, by the first network node, a response message from the second network node.

4. A communication method, comprising:
   establishing, by a second network node based on an initial stream control transmission protocol (SCTP) association, an SCTP association pool associating the second network node with a first network node; and
   receiving, by the second network node, first signaling from the first network node via an SCTP association of the SCTP association pool, the SCTP association being selected by the first network node,
   wherein establishing the SCTP association pool comprises:
      establishing, by the second network node, the initial SCTP association associating the first network node with the second network node; and
      receiving, by the second network node, second signaling from the first network node to add one or more SCTP associations to the initial SCTP association, the second signaling including application protocol layer update signaling carrying a list of the one or more SCTP associations to be added.

5. The communication method of claim 4, wherein the application protocol layer update signaling includes a core network configuration update message.

6. The communication method of claim 4, further comprising:
   receiving, by the second network node from the first network node, an update request message, wherein the update request message includes instructions to delete one or more SCTP associations; and
   transmitting, by the second network node in response to receiving the update request message, a response message to the first network node.

7. A non-transitory computer-readable storage medium, which is configured to store computer programs, wherein the computer programs are configured to, when executed by a processor, implement steps of the method of claim 1.

8. A non-transitory computer-readable storage medium, which is configured to store computer programs, wherein the computer programs are configured to, when executed by a processor, implement steps of the method of claim 2.

9. A non-transitory computer-readable storage medium, which is configured to store computer programs, wherein the computer programs are configured to, when executed by a processor, implement steps of the method of claim 3.

10. A non-transitory computer-readable storage medium, which is configured to store computer programs, wherein the computer programs are configured to, when executed by a processor, implement steps of the method of claim 4.

11. A non-transitory computer-readable storage medium, which is configured to store computer programs, wherein the computer programs are configured to, when executed by a processor, implement steps of the method of claim 5.

12. A non-transitory computer-readable storage medium, which is configured to store computer programs, wherein the computer programs are configured to, when executed by a processor, implement steps of the method of claim 6.

13. A network device comprising:
- at least one processor configured to:
  - establish, based on an initial stream control transmission protocol (SCTP) association, an SCTP association pool associating the network device with a second network device;
  - select from the SCTP association pool, an SCTP association for first signaling transmission; and
  - transmit the first signaling to the second network device via the selected SCTP association,
  - wherein in establishing the SCTP association pool, the at least one processor is configured to:
    - establish, by the first network node, the initial SCTP association associating the network device with the second network device; and
    - transmit second signaling to the second network device to add one or more SCTP associations to the initial SCTP association, the second signaling including application protocol layer update signaling carrying a list of the one or more SCTP associations to be added.

14. A network device comprising:
- at least one processor configured to:
  - establish, based on an initial stream control transmission protocol (SCTP) association, an SCTP association pool associating the network device with a second network device; and
  - receive first signaling from the second network device via an SCTP association of the SCTP association pool, the SCTP association selected by the second network device,
  - wherein in establishing the SCTP association pool, the at least one processor is configured to:
    - establish the initial SCTP association associating the second network device with the second network device; and
    - receive second signaling from the second network device to add one or more SCTP associations to the initial SCTP association, the second signaling including application protocol layer update signaling carrying a list of the one or more SCTP associations to be added.

* * * * *